United States Patent
Fujisawa et al.

(10) Patent No.: US 11,567,615 B2
(45) Date of Patent: Jan. 31, 2023

(54) DISPLAY DEVICE

(71) Applicant: Japan Display Inc., Tokyo (JP)

(72) Inventors: Akihiko Fujisawa, Tokyo (JP); Kaoru Ito, Tokyo (JP); Daichi Abe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/577,492

(22) Filed: Jan. 18, 2022

(65) Prior Publication Data

US 2022/0229515 A1    Jul. 21, 2022

(30) Foreign Application Priority Data

Jan. 19, 2021   (JP) .............................. JP2021-006534

(51) Int. Cl.
*G06F 3/041* (2006.01)
*G06F 3/044* (2006.01)

(52) U.S. Cl.
CPC .......... *G06F 3/0443* (2019.05); *G06F 3/0412* (2013.01); *G06F 2203/04107* (2013.01)

(58) Field of Classification Search
CPC .......... G06F 3/0412; G06F 3/041–047; G06F 2203/041–04114; G06F 3/0443; G06F 3/04164; G02F 1/13338
See application file for complete search history.

(56) References Cited

U.S. PATENT DOCUMENTS

2010/0182273 A1\* 7/2010 Noguchi ............. G02F 1/13338
345/173
2019/0095008 A1   3/2019 Murata et al.

FOREIGN PATENT DOCUMENTS

JP   2019-061563 A   4/2019

\* cited by examiner

*Primary Examiner* — Sanjiv D. Patel
(74) *Attorney, Agent, or Firm* — K&L Gates LLP

(57) ABSTRACT

According to one embodiment, a display device includes a first substrate, a second substrate to the first substrate opposed, detection electrodes provided to surround a display area where an image is displayed, and a common electrode provided over an entire surface of the display area. The common electrode includes a first lead wiring line that extends to a peripheral area around the display area, along a boundary part between a first detection electrode, which is one of the detection electrodes, and a second detection electrode adjacent to the first detection electrode. A capacitance formed between the first lead wiring line and the first detection electrode is substantially equal to a capacitance formed between the first lead wiring line and the second detection electrode.

7 Claims, 18 Drawing Sheets

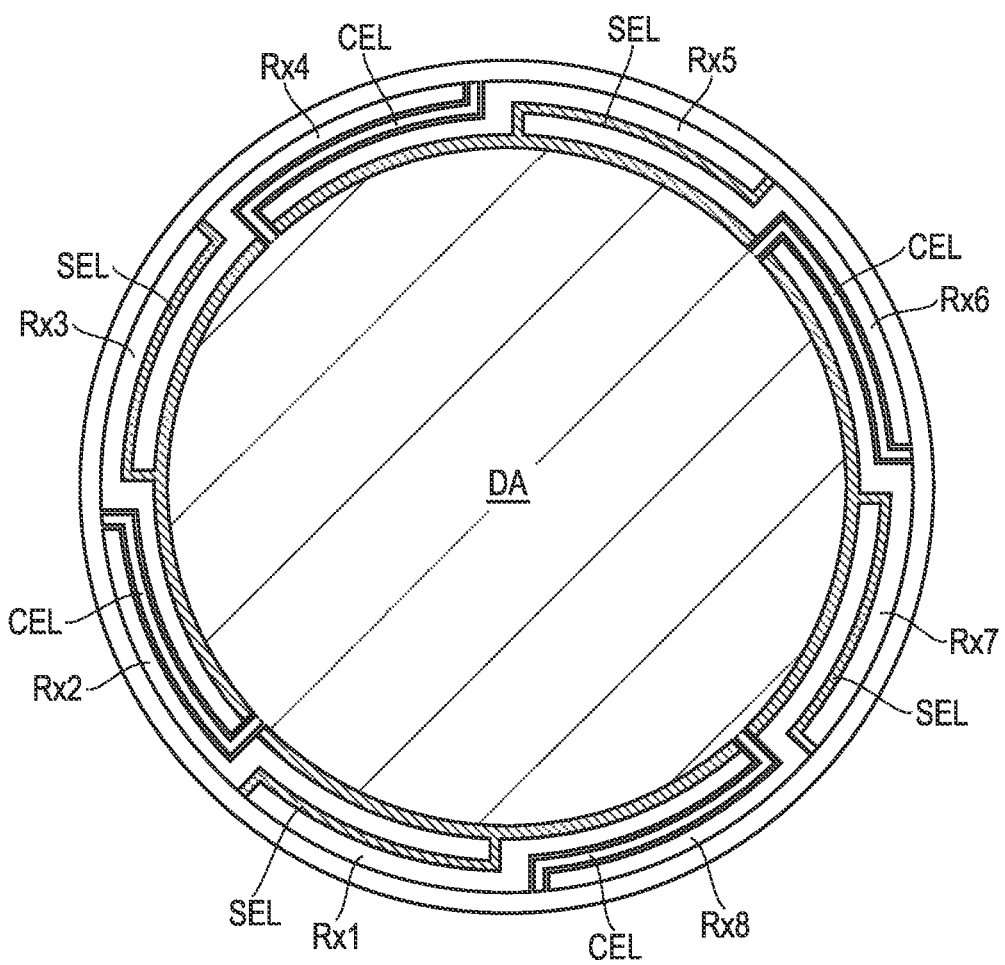
F I G. 14

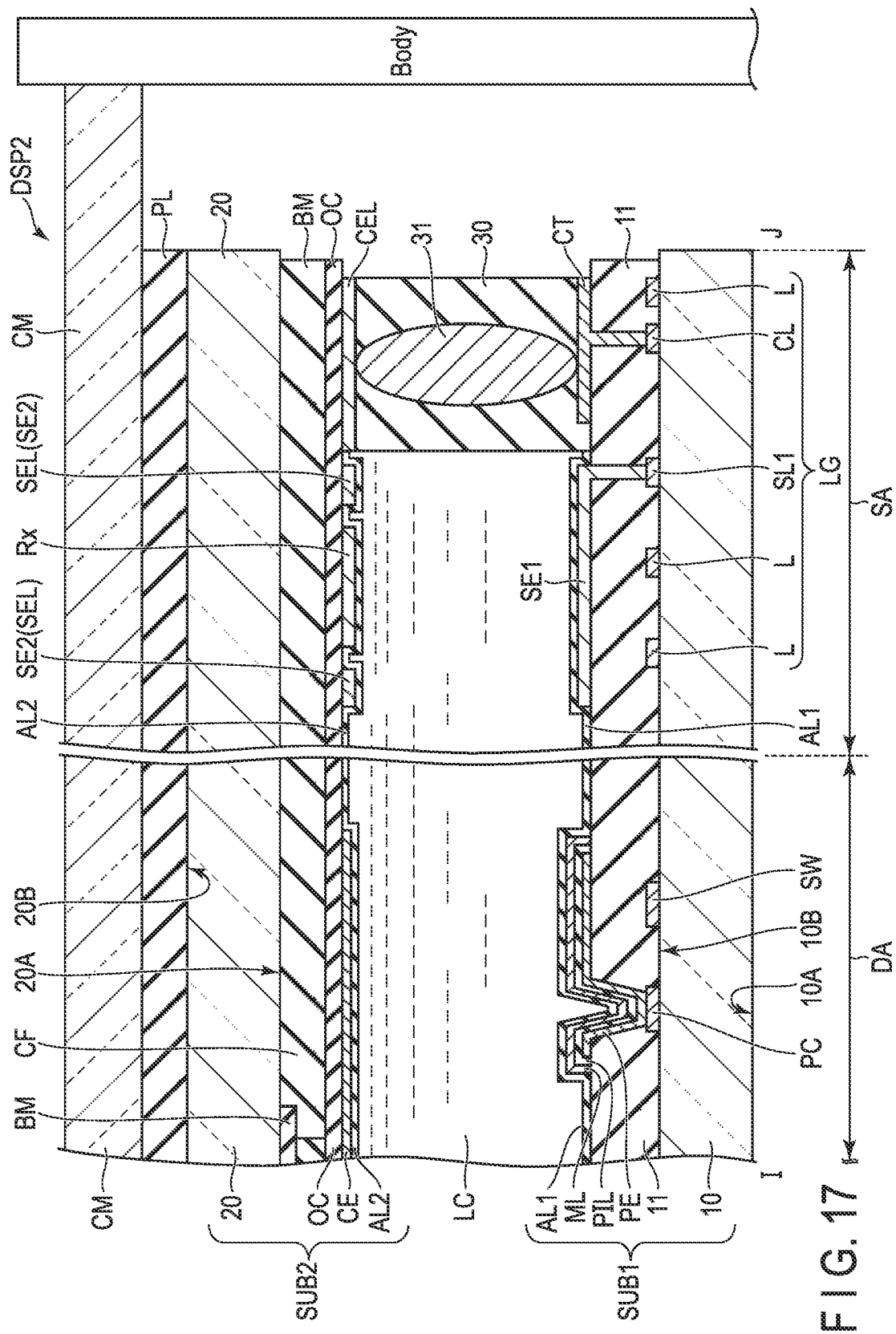
F I G. 17

DISPLAY DEVICE

CROSS-REFERENCE TO RELATED APPLICATIONS

This application is based upon and claims the benefit of priority from Japanese Patent Application No. 2021-006534, filed Jan. 19, 2021, the entire contents of which are incorporated herein by reference.

FIELD

Embodiments described herein relate generally to a display device.

BACKGROUND

In recent years, wearable devices (for example, wristwatch-type wearable devices, eyeglass-type wearable devices, and the like) have gradually become prevalent as a type of display devices with a touch detection function. Such wearable devices are required to have both display quality when displaying images and excellent touch operability, and various developments have been made. For example, a wearable device having a configuration in which touch sensors are arranged around a display area for displaying an image has been developed.

BRIEF DESCRIPTION OF THE DRAWINGS

FIG. 14 is a plan view showing another configuration example of the display device according to the embodiment.

FIG. 17 is a cross-sectional view showing a cross section of the display device taken along line I-J of FIG. 13.

DETAILED DESCRIPTION

Figure 1:
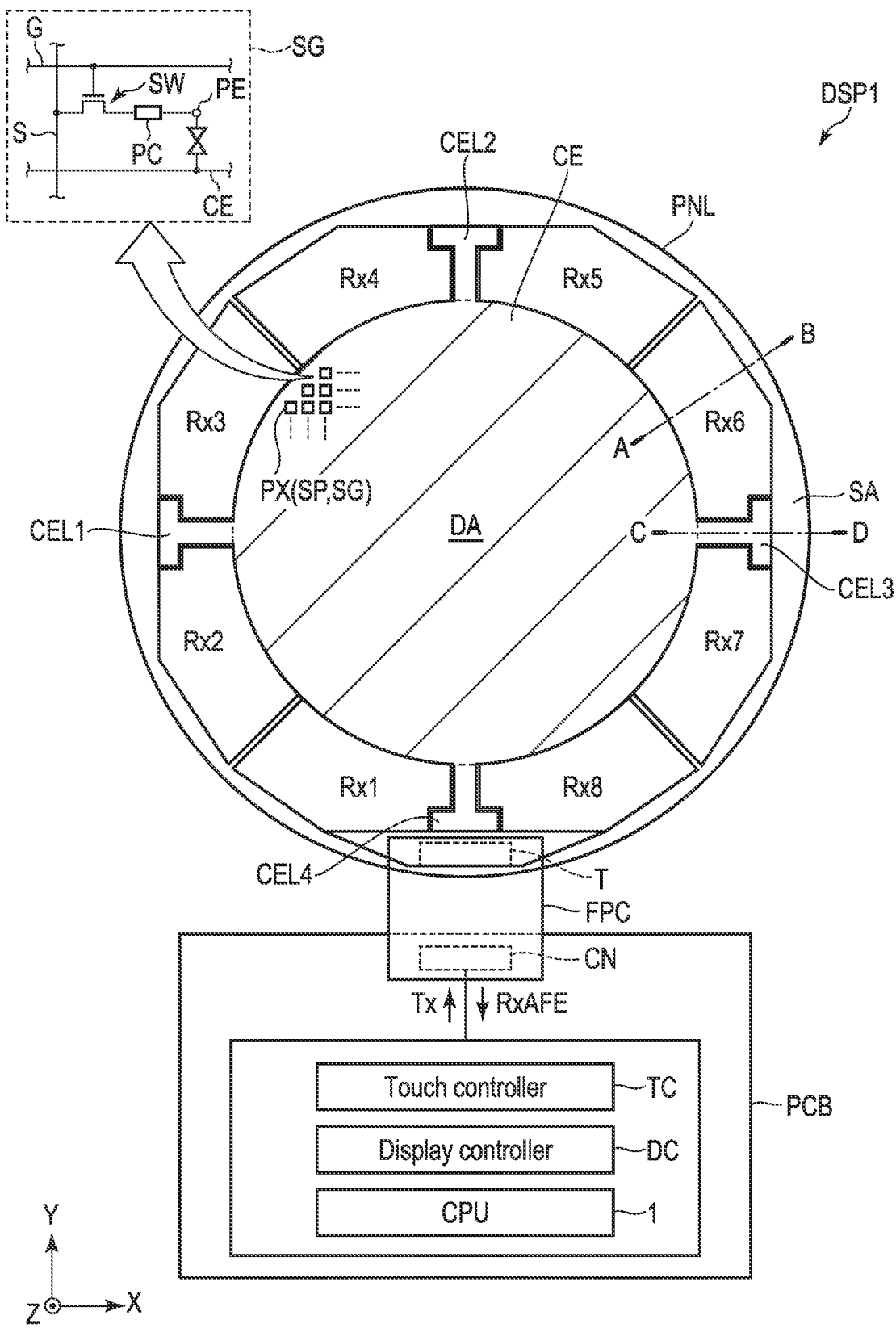
FIG. 1 is a plan view showing a configuration example of a display device according to a first embodiment.

In general, according to one embodiment, a display device comprises a first substrate, a second substrate opposed to the first substrate, detection electrodes provided to surround a display area where an image is displayed, and a common electrode provided over an entire surface of the display area. The common electrode includes a first lead wiring line that extends to a peripheral area around the display area, along a boundary part between a first detection electrode, which is one of the detection electrodes, and a second detection electrode adjacent to the first detection electrode. A capacitance formed between the first lead wiring line and the first detection electrode is substantially equal to a capacitance formed between the first lead wiring line and the second detection electrode.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the embodiments are schematically illustrated in the drawings, compared to the actual modes. However, the schematic illustration is merely an example, and adds no restrictions to the interpretation of the invention. Besides, in the specification and drawings, structural elements performing the functions that are the same as or similar to those described above in connection with preceding drawings are denoted by like reference numerals, detailed description thereof being omitted unless necessary.

In each of the embodiments, a display device with a touch detection function will be described as an example of a display device. The touch detection types include various types such as an optical type, a resistive type, a capacitive type, and an electromagnetic induction type. The capacitive type of the various detection types is a detection type based on a phenomenon that the capacitance changes due to approach or contact of an object (for example, a finger or the like), and has advantages that the device can be implemented with a relatively simple structure, power consumption is low, and the like. In each embodiment, a display device with a touch detection function of the capacitive type is mainly described.

The capacitive type implies the mutual capacitive type, which generates an electric field between a pair of a transmitting electrode (drive electrode) and a receiving electrode (detection electrode) arranged in a state of being separated from each other to detect changes in the electric field caused due to approach or contact of an object, and the self-capacitive type, which uses a single electrode to detect changes in capacitance caused due to the approach or contact of an object. In each embodiment, a display device with a touch detection function of the self-capacitive type will be mainly described.

First Embodiment

FIG. 1 is a plan view showing a configuration example of a display device DSP1 according to a first embodiment. For example, the first direction X, the second direction Y, and the third direction Z are orthogonal to each other but may intersect at an angle other than 90 degrees. The first direction X and the second direction Y correspond to the directions parallel to the main surface of a substrate constituting the display device DSP, and the third direction Z corresponds to the thickness direction of the display device DSP1. The third direction Z is defined herein as an upper or upward direction, and a direction opposite to the third direction Z is defined herein as a lower or downward direction. According to "a second member above/on a first member" and "a second member below/under a first member", the second member may be in contact with the first member or may be separated from the first member. In addition, an observation position at which the display device DSP is to be observed is assumed to be set at the pointing end side of the arrow indicating the third direction Z, and viewing toward an X-Y plane defined by the first direction X and the second direction Y from this observation position is hereinafter referred to as planar view.

As shown in FIG. 1, a display device DSP1 comprises a display panel PNL, a flexible printed circuit board FPC, and a printed circuit board PCB. The display panel PNL and the printed circuit board PCB are electrically connected to each other via the flexible printed circuit board FPC. More specifically, a terminal portion T of the display panel PNL and a connection portion CN of the printed circuit board PCB are electrically connected to each other via the flexible printed circuit board FPC.

The display panel PNL has a display area DA for displaying an image and a frame-shaped peripheral area SA surrounding the display area DA. The display area DA may be referred to as the display portion. The peripheral area SA may be referred to as a peripheral portion, a frame portion or a non-display portion. Pixels PX are arranged in the display area DA. More specifically, a large number of pixels PX are arrayed in a matrix along the first direction X and the second direction Y in the display area DA.

In the present embodiment, the pixel PX includes red (R), green (G), and blue (B) sub-pixels SP. In addition, each of the sub-pixels SP includes segment pixels SG. Each of the segment pixels SG includes a pixel electrode with a different area, and gradation is formed for each sub-pixel SP by switching the display/non-display of these segment pixels SG.

As shown and enlarged in FIG. 1, the segment pixel SG comprises a switching element SW, a pixel circuit PC, a pixel electrode PE, a common electrode CE, a liquid crystal layer LC and the like.

The switching element SW is constituted by, for example, a thin-film transistor (TFT) and is electrically connected to a scanning line G and a signal line S. The scanning line G is electrically connected to the switching element SW in each of the segment pixels SG arranged in the first direction X. The signal line S is electrically connected to the switching element SW in each of the segment pixels SG arranged in the second direction Y.

The pixel electrode PE is electrically connected to the switching element SW via the pixel circuit PC. Each of the pixel electrodes PE is opposed to the common electrode CE, and drives the liquid crystal layer LC by an electric field produced between the pixel electrode PE and the common electrode CE. In the present embodiment, a configuration in which the pixel electrode PE is electrically connected to the switching element SW via the pixel circuit PC is exemplified, but the pixel electrode PE may be electrically connected to the switching element SW without the pixel circuit PC.

Of a plurality of concentric circles of FIG. 1, the area represented by the innermost circle corresponds to the display area DA, and the area between the outermost circle and the innermost circle corresponds to the peripheral area SA. In other words, the area with hatch lines in FIG. 1 corresponds to the display area DA and the other area corresponds to the peripheral area SA.

In the present embodiment, the case in which the display area DA has a circular shape and the peripheral area SA surrounding the display area DA also has a shape of the same type, but the areas are not limited thereto, and the display area DA may not have a circular shape and the peripheral area SA may have a shape of a different type from the display area DA. For example, the display area DA and the peripheral area SA may have polygonal shapes. Furthermore, when the display area DA has a polygonal shape, the peripheral area SA may have a circular shape, which is a shape of a different type from the display area DA.

The common electrode CE described above is arranged over the entire surface in the display area DA. In addition, as shown in FIG. 1, the common electrode CE includes first lead wiring lines CEL1 to CEL4 extending along boundary parts between detection electrodes to be described later. The first lead wiring lines CEL1 to CEL4 extend from the display area DA to the peripheral area SA, and are electrically connected to wiring lines (not shown) for applying power to the common electrode CE via conductive pearls (conductive members) contained in a sealant to be described later.

As shown in FIG. 1, detection electrodes Rx1 to Rx8 are arranged in the peripheral area SA so as to surround the display area DA. Eight detection electrodes Rx1 to Rx8 are exemplified in FIG. 1, but the number of detection electrodes Rx arranged in the peripheral area SA is not limited thereto and any number of detection electrodes Rx may be arranged to surround the display area DA. In addition, the case in which the detection electrodes Rx1 to Rx8 have polygonal shapes is exemplified in FIG. 1, but the shape is not limited thereto and the detection electrodes Rx1 to Rx8 may have, for example, arc shapes (arch shapes) or any other shapes.

The detection electrodes Rx1 to Rx8 are electrically connected to the terminal portion T arranged in the peripheral area SA via Rx wiring lines (not shown). The Rx wiring lines extend, for example, along the outer periphery of the detection electrodes Rx1 to Rx8. The Rx wiring lines are used to supply drive signals Tx to the detection electrodes Rx1 to Rx8, and to output detection signals RxAFEs from the detection electrodes Rx1 to Rx8.

The first lead wiring lines CEL1 to CEL4 extending from the common electrode CE will be hereinafter described in detail.

As shown in FIG. 1, each of the first lead wiring lines CEL1 to CEL4 extends along a boundary part between a predetermined detection electrode Rx and a detection electrode Rx adjacent to the predetermined detection electrode Rx.

More specifically, as shown in FIG. 1, the first lead wiring line CEL1 extends along a boundary part between the detection electrode Rx2 and the detection electrode Rx3 adjacent to the detection electrode Rx2. According to this, the fringe capacitance formed between the first lead wiring line CEL1 and the detection electrode Rx2 can be made substantially equal to the fringe capacitance formed between the first lead wiring line CEL1 and the detection electrode Rx3.

The first lead wiring line CEL2 extends along a boundary part between the detection electrode Rx4 and the detection electrode Rx5 adjacent to the detection electrode Rx4. According to this, the fringe capacitance formed between the first lead wiring line CEL2 and the detection electrode Rx4 can be made substantially equal to the fringe capacitance formed between the first lead wiring line CEL2 and the detection electrode Rx5.

The first lead wiring line CEL3 extends along a boundary part between the detection electrode Rx6 and the detection electrode Rx7 adjacent to the detection electrode Rx6. According to this, the fringe capacitance formed between the first lead wiring line CEL3 and the detection electrode Rx6 can be made substantially equal to the fringe capacitance formed between the first lead wiring line CEL3 and the detection electrode Rx7.

The first lead wiring line CEL4 extends along a boundary part between the detection electrode Rx8 and the detection electrode Rx1 adjacent to the detection electrode Rx8. According to this, the fringe capacitance formed between the first lead wiring line CEL4 and the detection electrode Rx8 can be made substantially equal to the fringe capacitance formed between the first lead wiring line CEL4 and the detection electrode Rx1.

As described above, according to the method of drawing the first lead wiring line CEL shown in FIG. 1, each of the detection electrodes Rx1 to Rx8 forms a fringe capacitance together with any one of the first lead wiring lines CEL1 to CEL4. In other words, according to the method of drawing the first lead wiring lines CEL shown in FIG. 1, the influence on each of the detection electrodes Rx1 to Rx8 caused by drawing the first lead wiring lines CEL to the peripheral area SA can be equalized.

In addition, according to the method of drawing the first lead wiring lines CEL shown in FIG. 1, since the two detection electrodes Rx (for example, detection electrodes Rx2 and Rx3, detection electrodes Rx4 and Rx5, detection electrodes Rx6 and Rx7, and detection electrodes Rx8 and Rx1) sandwiching the first lead wiring line CEL become symmetrical to each other and since the areas of the two detection electrodes Rx become the same, the capacitances formed respectively at two detection electrodes Rx can be made equal.

Figure 2:
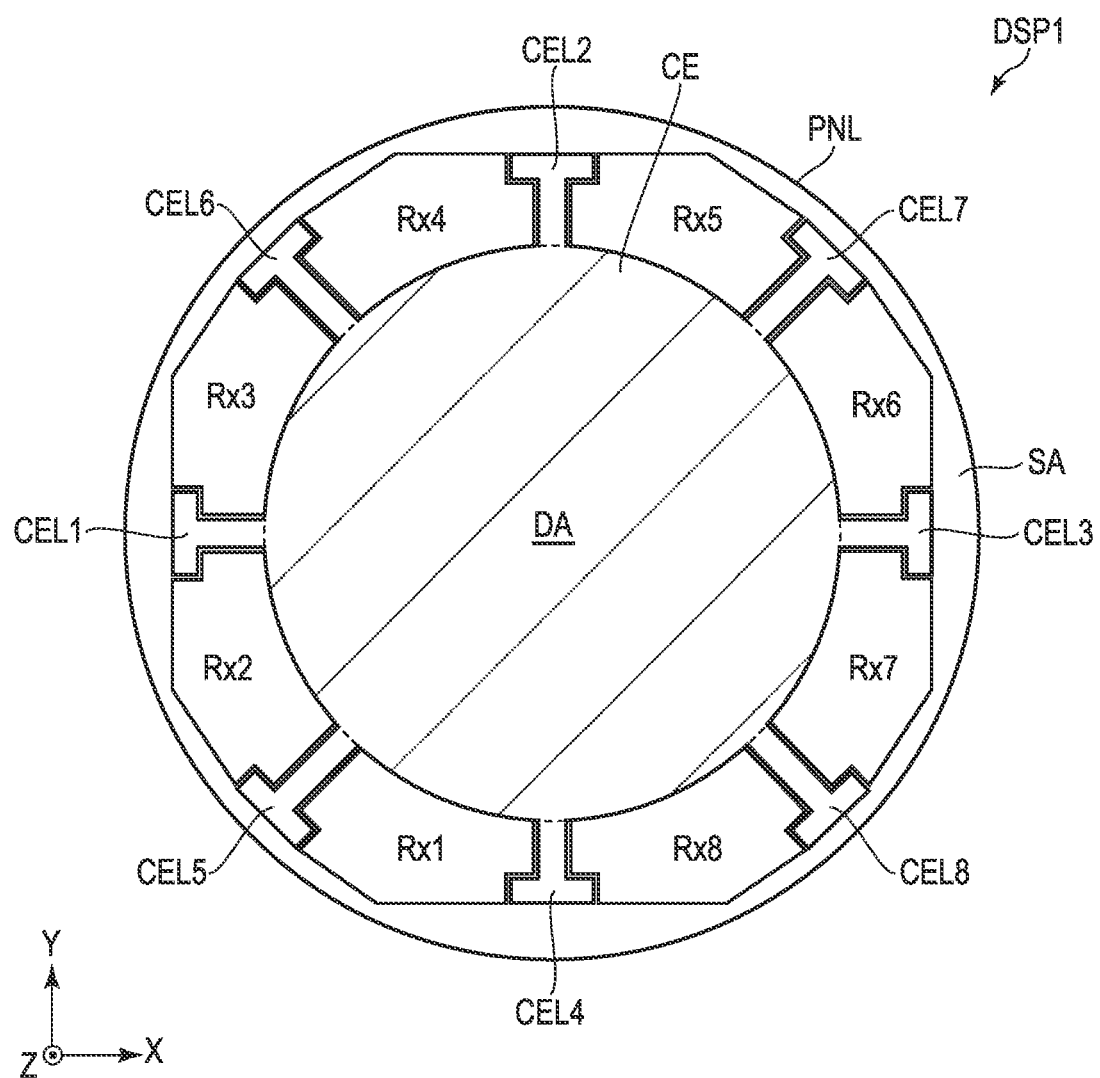
FIG. 2 is a plan view showing another configuration example of the display device according to the embodiment.

The drawing method shown in FIG. 1 is exemplified as a method of drawing the first lead wiring lines CEL that enables an influence on each of the detection electrodes Rx1 to Rx8 to be equalized, but the method of drawing the first lead wiring lines CEL are not limited thereto and, for example, the first lead wiring lines CEL may be drawn as shown in FIG. 2.

In the drawing method shown in FIG. 2, in addition to the four first lead wiring lines CEL1 to CEL4 shown in FIG. 1, the first lead wiring line CEL5 extending along the boundary part between detection electrodes Rx1 and Rx2, the first lead wiring line CEL6 extending along the boundary part between detection electrodes Rx3 and Rx4, the first lead wiring line CEL7 extending along the boundary part between the detection electrodes Rx5 and Rx6, and the first lead wiring line CEL8 extending along the boundary part between the detection electrodes Rx7 and Rx8, are further drawn from the display area DA to the peripheral area SA.

In this case, the detection electrode Rx1 forms a fringe capacitance between the detection electrode Rx1 and the first lead wiring line CEL4, and between the detection electrode Rx1 and the first lead wiring line CEL5. In this case, the detection electrode Rx2 forms a fringe capacitance between the detection electrode Rx2 and the first lead wiring line CEL5, and between the detection electrode Rx2 and the first lead wiring line CEL1. Furthermore, the detection electrode Rx3 forms a fringe capacitance between the detection electrode Rx3 and the first lead wiring line CEL1, and between the detection electrode Rx3 and the first lead wiring line CEL6. Descriptions of formation of a fringe capacitance between each of the detection electrodes Rx4 to Rx8 and each of the first lead wiring lines CEL will be omitted below, but the detection electrodes Rx4 to Rx8 also form fringe capacitances between itself and the two first lead wiring lines CEL that are provided at the boundary parts between the adjacent detection electrodes Rx, similarly to the above-described detection electrodes Rx1 to Rx3.

In other words, according to the drawing method shown in FIG. 2, since each of the detection electrodes Rx1 to Rx8 forms fringe capacitances together with any two of the first lead wiring lines CEL1 to CEL8, the influence on each of the detection electrodes Rx1 to Rx8 caused by drawing the first lead wiring lines CEL to the peripheral area SA can be equalized even in the drawing method shown in FIG. 2.

In addition, according to the drawing method shown in FIG. 2, since the area of each of the detection electrodes Rx1 to Rx8 becomes equal, the capacitance formed in each of the detection electrodes Rx1 to Rx8 can be made equal.

Figure 3:
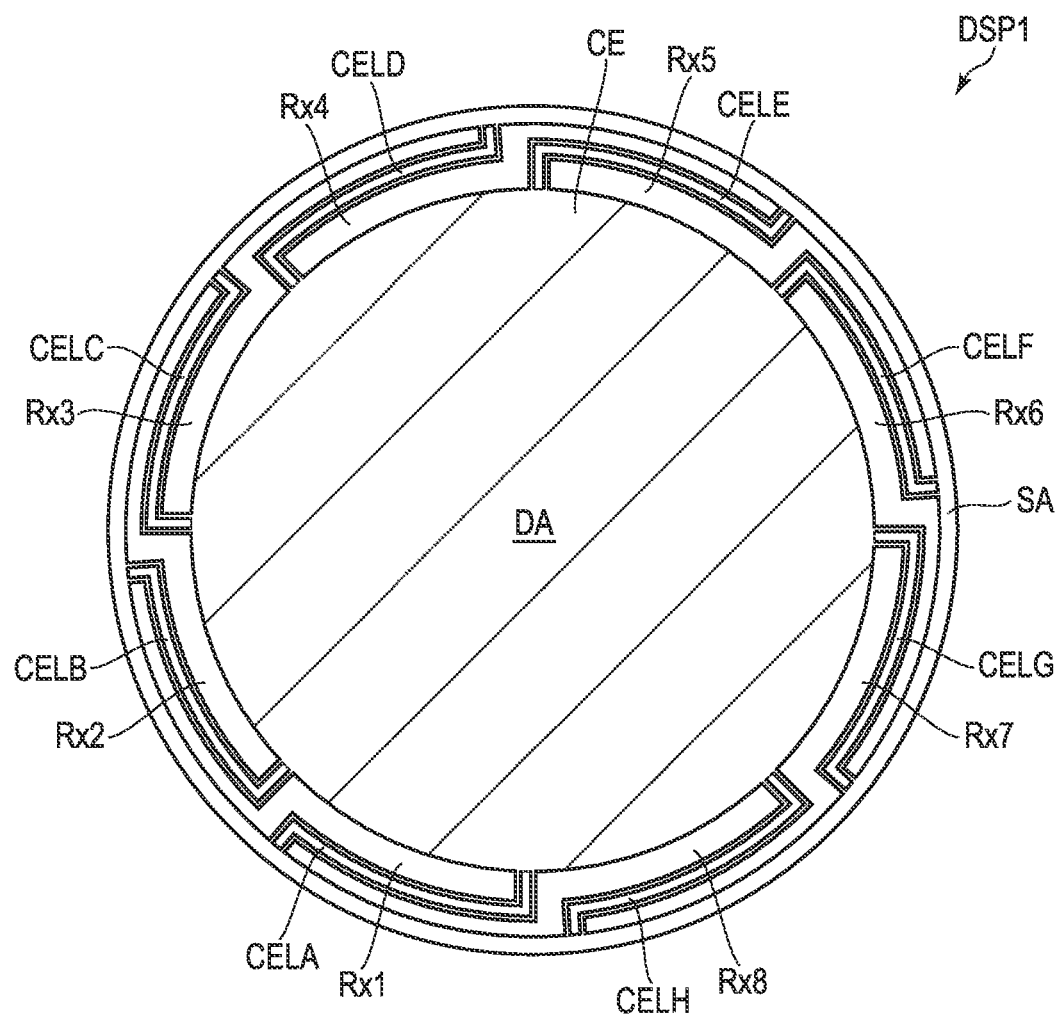
FIG. 3 is a plan view showing yet another configuration example of the display device according to the embodiment.

Furthermore, one of methods of drawing the first lead wiring lines CEL that enables the influence on each of the detection electrodes Rx1 to Rx8 to be equalized is, for example, a drawing method shown in FIG. 3. In FIG. 3, it is assumed that the shape of the detection electrodes Rx1 to Rx8 is different from that in FIG. 1 and FIG. 2 and is a shape (S-letter shape) formed by aligning and combining two arcs (arches) in the circumferential direction such that the arcs are displaced on inner and outer sides. In this case, too, it is desirable that the first lead wiring line CEL extends along the boundary part between the predetermined detection electrode Rx and the detection electrode Rx adjacent to the predetermined detection electrode Rx.

In FIG. 3, the first lead wiring line CELA extends along the boundary part between the detection electrode Rx1 and the detection electrode Rx2. The first lead wiring line CELB extends along the boundary part between the detection electrode Rx2 and the detection electrode Rx3. The first lead wiring line CELC extends along the boundary part between the detection electrode Rx3 and the detection electrode Rx4. The first lead wiring line CELD extends along the boundary part between the detection electrode Rx4 and the detection electrode Rx5. The first lead wiring line CELE extends along the boundary part between the detection electrode Rx5 and the detection electrode Rx6. The first lead wiring line CELF extends along the boundary part between the detection electrode Rx6 and the detection electrode Rx7. The first lead wiring line CELG extends along the boundary part between the detection electrode Rx7 and the detection electrode Rx8. The first lead wiring line CELH extends along the boundary part between the detection electrode Rx8 and the detection electrode Rx1.

In this case, the detection electrode Rx1 forms a fringe capacitance between the detection electrode Rx1 and the first lead wiring line CELA, and between the detection electrode Rx1 and the first lead wiring line CELH. In addition, the detection electrode Rx2 forms a fringe capacitance between the detection electrode Rx2 and the first lead wiring line CELB, and between the detection electrode Rx2 and the first lead wiring line CELA. Furthermore, the detection electrode Rx3 forms a fringe capacitance between the detection electrode Rx3 and the first lead wiring line CELC, and between the detection electrode Rx3 and the first lead wiring line CELB. Descriptions of formation of a fringe capacitance between each of the detection electrodes Rx4 to Rx8 and each of the first lead wiring lines CEL will be omitted below, but the detection electrodes Rx4 to Rx8 also form fringe capacitances between itself and the two first lead wiring lines CEL that are provided at the boundary parts between the adjacent detection electrodes Rx, similarly to the above-described detection electrodes Rx1 to Rx3.

In other words, according to the drawing method shown in FIG. 3, since each of the detection electrodes Rx1 to Rx8 forms fringe capacitances together with any two of the first lead wiring lines CELA to CELH, the influence on each of the detection electrodes Rx1 to Rx8 caused by drawing the first lead wiring lines CEL to the peripheral area SA can be equalized even in the drawing method shown in FIG. 3.

The descriptions will return to those of FIG. 1.

As shown in FIG. 1, a touch controller TC, a display controller DC, a CPU 1, and the like are provided on the circuit board PCB.

The touch controller TC outputs drive signals Tx to the detection electrodes Rx1 to Rx8 arranged on the display panel PNL, and receives input of detection signals (RxAFE signals) from the detection electrodes Rx1 to Rx8 (i.e., detects approach or contact of an external proximate object). The touch controller TC may be referred to as a detection unit.

The drive signals Tx output from the touch controller TC may be supplied in time division to the detection electrodes Rx1 to Rx8 or may be supplied to all of the detection electrodes Rx1 to Rx8 at once. In addition, in the touch period in which the drive signals Tx are output from the touch controller TC to the detection electrodes Rx1 to Rx8, the common electrode CE may be set to a high impedance state or a floating state.

The display controller DC outputs a video signal indicating an image to be displayed in the display area DA of the display panel PNL in a display period that is alternately repeated with the touch period described above.

The CPU 1 executes outputting a synchronous signal that defines the operation timing of the touch controller TC and the display controller DC, an operation responding to a touch detected by the touch controller TC, and the like.

Figure 4:
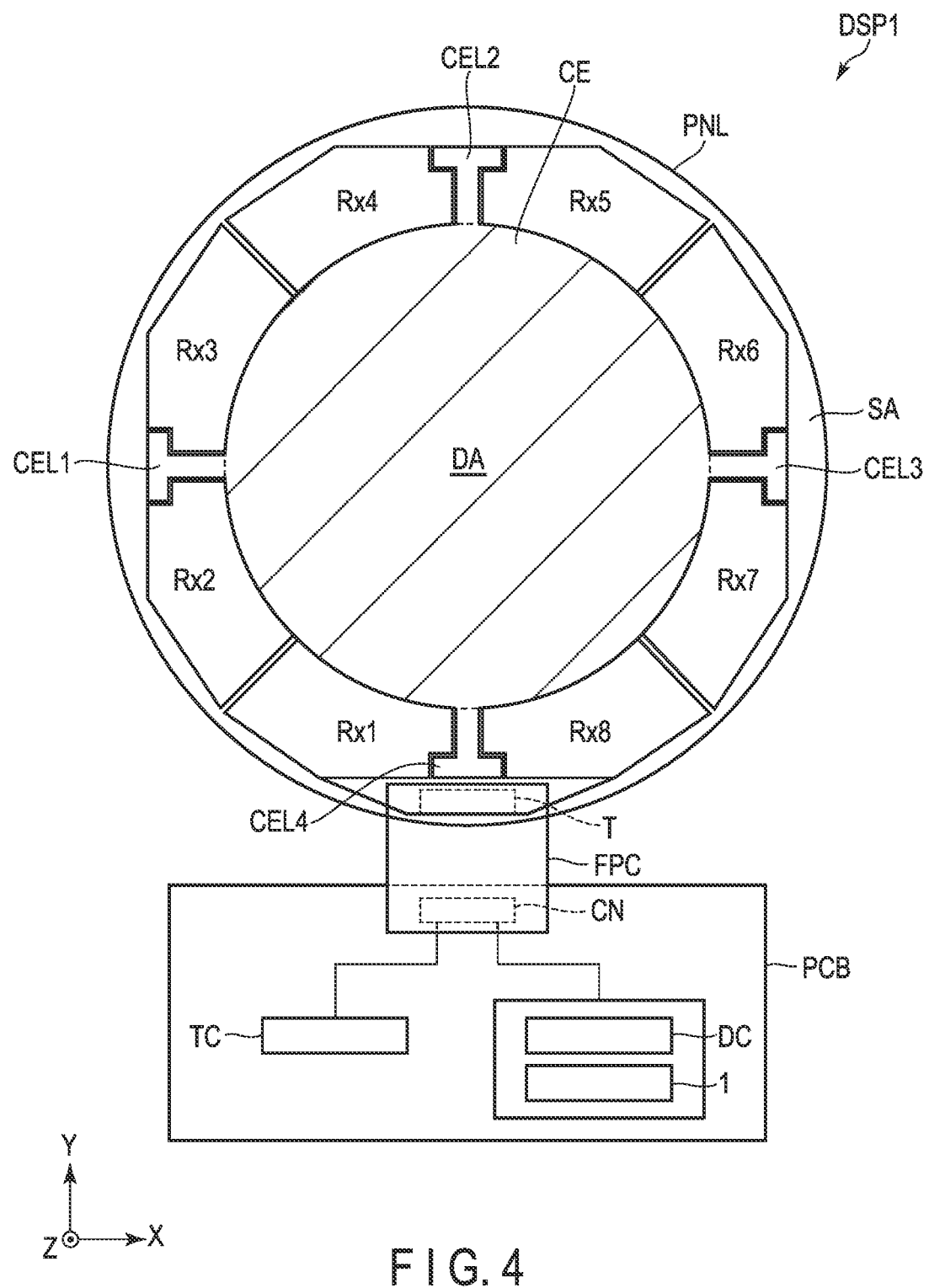
FIG. 4 is a plan view showing yet another configuration example of the display device according to the embodiment.
Figure 5:
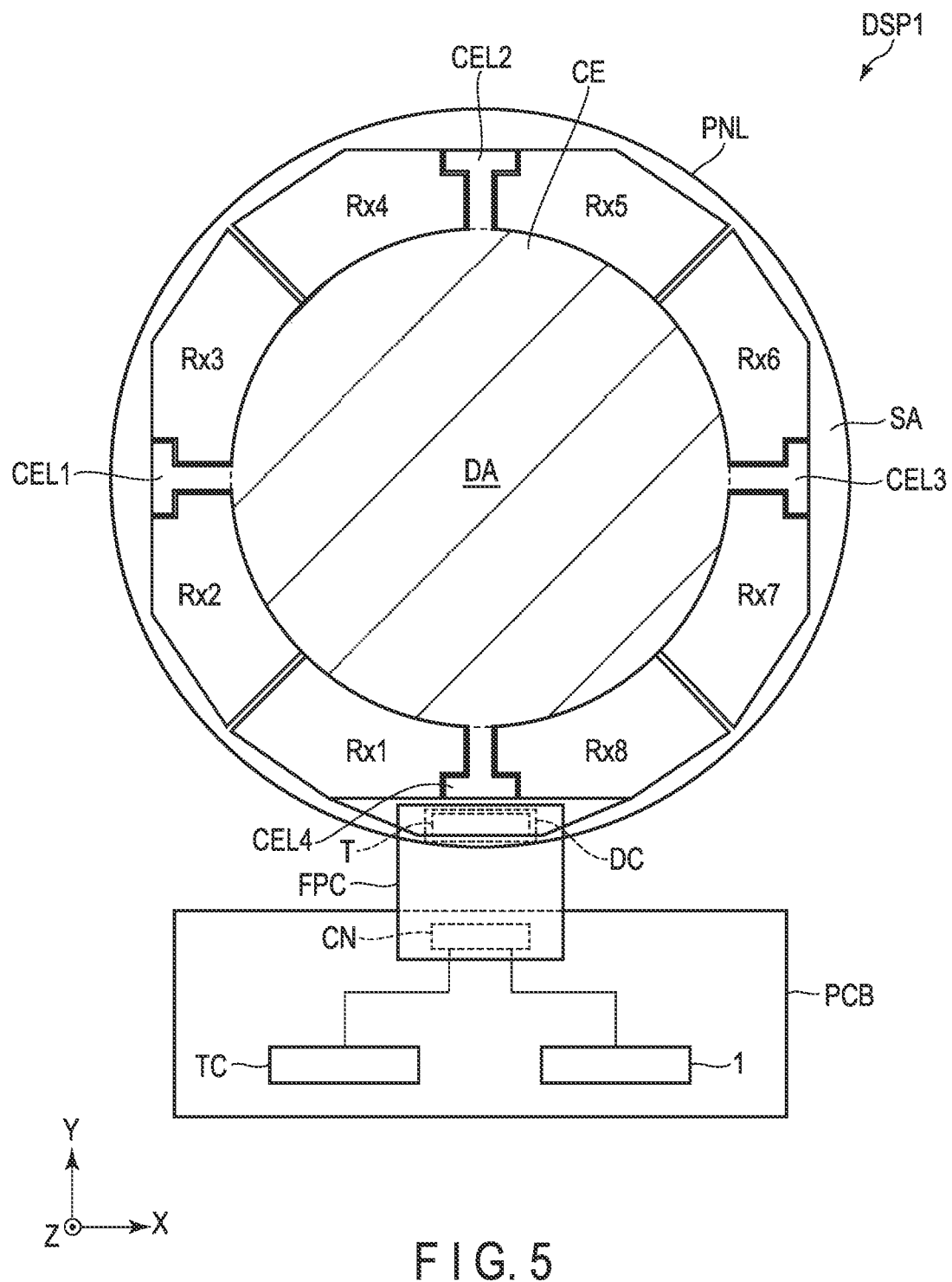
FIG. 5 is a plan view showing yet another configuration example of the display device according to the embodiment.
Figure 6:
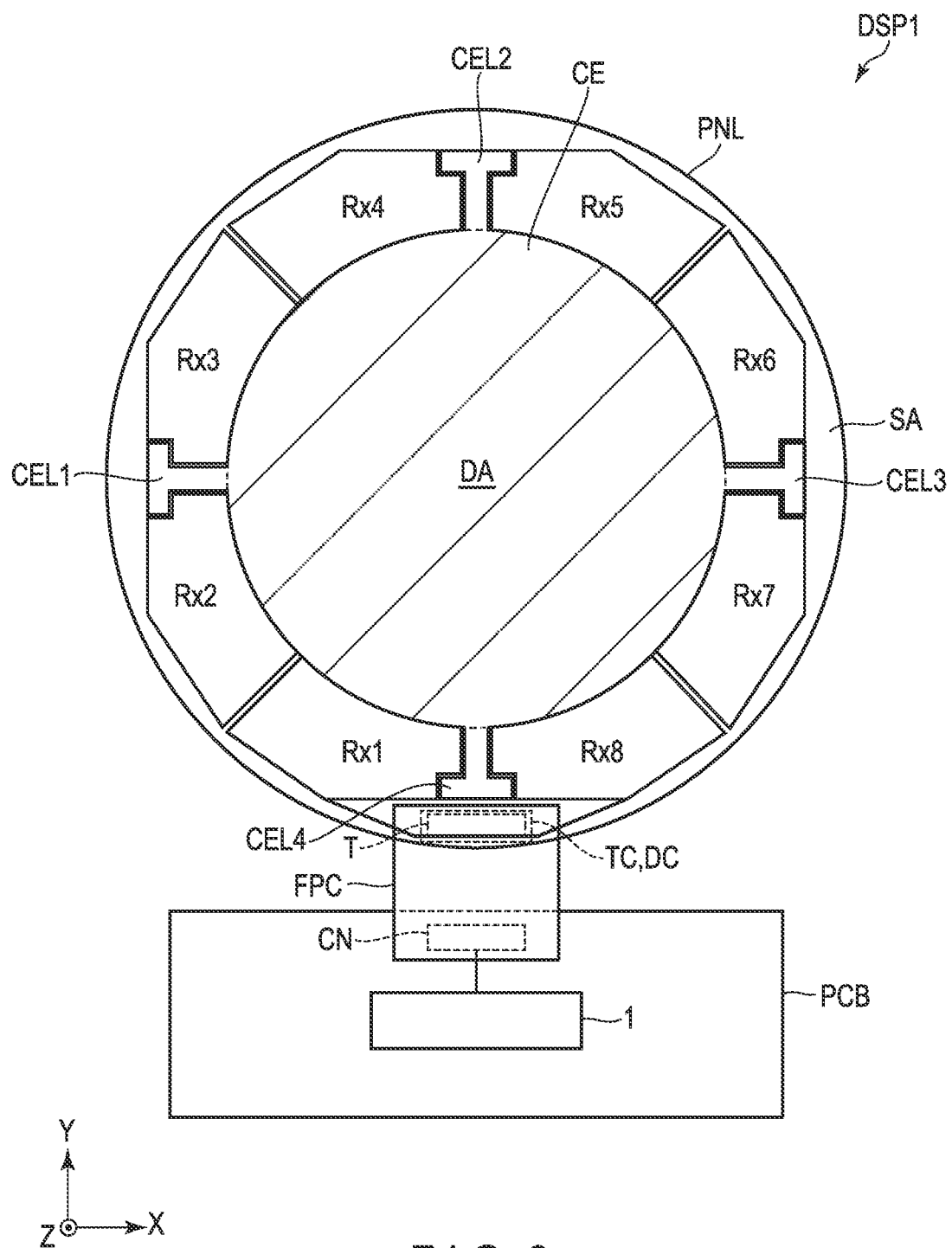
FIG. 6 is a plan view showing yet another configuration example of the display device according to the embodiment.

In FIG. 1, the case where the touch controller TC, the display controller DC, and the CPU1 are realized by one semiconductor chip has been exemplified, but their mounting aspects are not limited to this and, for example, only the touch controller TC may be separated as a separate body and each portion may be mounted on the circuit board PCB as shown in FIG. 4, the touch controller TC and the CPU 1 may be separately mounted on the circuit board PCB and the display controller DC may be mounted on the display panel PNL by Chip On Glass (COG) as shown in FIG. 5, or only the CPU 1 may be mounted on the circuit board PCB and the touch controller TC and the display controller DC may be mounted on the display panel PNL by COG as shown in FIG. 6.

Figure 7:
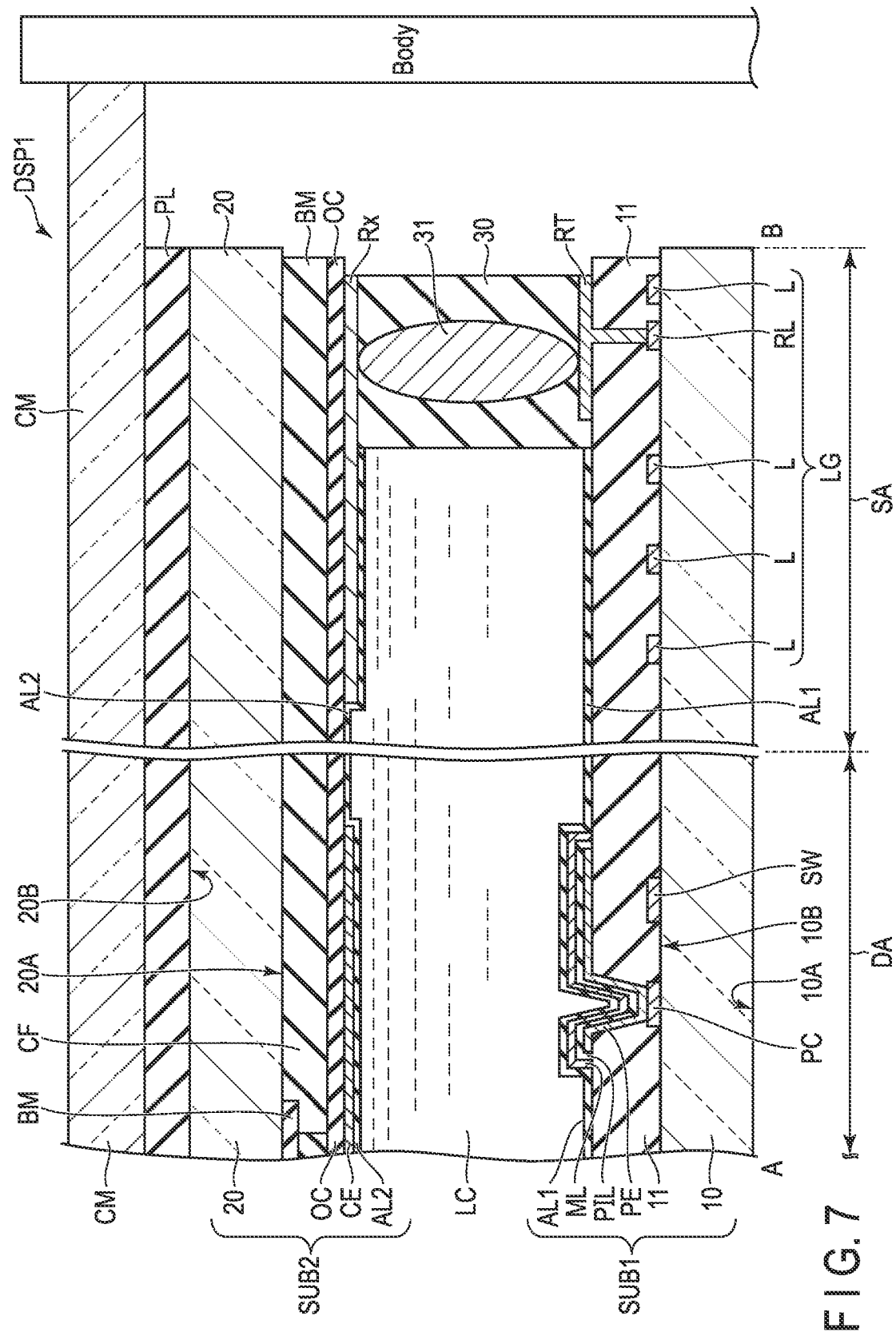
FIG. 7 is a cross-sectional view showing a cross section of the display device taken along line A-B of FIG. 1.

FIG. 7 is a cross-sectional view showing a cross section of the display device DSP1 taken along line A-B shown in FIG. 1. Each of the constitution on the display area DA side and the constitution on the peripheral area SA side will be described below.

The display device DSP1 comprises a first substrate SUB1, a second substrate SUB2, a sealant 30, a liquid crystal layer LC, a polarizer PL, and a cover member CM. The first substrate SUB1 may be referred to as an array substrate, and the second substrate SUB2 may be referred to as a counter-substrate. The first substrate SUB1 and the second substrate SUB2 are formed in a flat plate shape parallel to the X-Y plane.

The first substrate SUB1 and the second substrate SUB2 are overlapped in planar view and are bonded (connected) by the sealant 30. The liquid crystal layer LC is held between the first substrate SUB1 and the second substrate SUB2 and is sealed by the sealant 30. The sealant 30 contains a large number of conductive pearls 31 coated with metal, and the constitution on the first substrate SUB1 side and the constitution on the second substrate SUB2 side are thereby electrically connected to each other.

A polarizer PL is provided on the second substrate SUB2, and a cover member CM is further provided on the polarizer PL.

The case where the display device DSP1 is a reflective display device in which a backlight unit is not arranged is exemplified in FIG. 5, but the display device DSP1 is not limited thereto and may be a display device employing organic EL as pixels or a transmissive display device in which a backlight unit is arranged. Alternatively, the display device DSP1 may be a display device obtained by combining a reflective display device and a transmissive display device. Various types of backlight units can be employed as the backlight unit and, for example, a backlight unit using a light-emitting diode (LED) as a light source, a backlight unit using a cold-cathode fluorescent lamp (CCFL) and the like, can be employed. When the backlight unit is arranged, a polarizer is arranged between the first substrate SUB1 and the backlight unit (that is, under the first substrate SUB1).

On the display area DA side, the first substrate SUB1 is provided with a transparent substrate 10, a switching element SW, a pixel circuit PC, a planarization film 11, a pixel electrode PE, an interlayer insulating film PIL, a metal film ML, and an alignment film AL1, as shown in FIG. 7. In addition to the above-described constitution, the first substrate SUB1 is provided with a scanning line G, a signal line S, and the like as shown in FIG. 1, but their illustration is omitted in FIG. 7.

The transparent substrate 10 is provided with a main surface (lower surface) 10A and a main surface (upper surface) 10B on a side opposite to the main surface 10A. The switching element SW and the pixel circuit PC are arranged on the main surface 10B side. The planarization film 11 is composed of at least one or more insulating films and covers the switching element SW and the pixel circuit PC.

The pixel electrode PE is arranged on the planarization film 11 and is connected to the pixel circuit PC through a contact hole formed in the planarization film 11. The switching element SW, the pixel circuit PC, and the pixel electrode PE are arranged in each segment pixel SG. The pixel electrode PE is covered with an interlayer insulating film PIL. A metal film ML is provided on the interlayer insulating film PIL. The alignment film AL1 covers the planarization film 11 and the metal film ML and is in contact with the liquid crystal layer LC.

The switching element SW and the pixel circuit PC are simply illustrated in FIG. 7, but, in reality, the switching element SW and the pixel circuit PC include semiconductor layers and electrodes of each layer. In addition, the switching element SW and the pixel circuit PC are electrically connected to each other though its illustration is omitted in FIG. 7. Furthermore, as described above, the scanning line G and the signal line S, which are omitted in FIG. 7, are arranged, for example, between the transparent substrate 10 and the planarization film 11.

On the display area DA side, the second substrate SUB2 is provided with a transparent substrate 20, a light-shielding film BM, a color filter CF, an overcoat film OC, a common electrode CE, and an alignment film AL2, as shown in FIG. 7.

The transparent substrate 20 has a main surface (lower surface) 20A and a main surface (upper surface) 20B on a side opposite to the main surface 20A. The main surface 20A of the transparent substrate 20 is opposed to the main surface 10B of the transparent substrate 10. The light-shielding film BM divides each of the segment pixels SG. The color filter CF is arranged on the main surface 20A of the transparent substrate 20, opposed to the pixel electrodes PE, and partially overlaid on the light-shielding film BM. The color filter CF includes a red color filter, a green color filter, a blue color filter, and the like. The overcoat film OC covers the color filter CF.

The common electrode CE is arranged over the segment pixels SG (pixels PX) and opposed to the pixel electrodes PE in the third direction Z. The common electrode CE is arranged on the overcoat film OC. The alignment film AL2 covers the overcoat film OC and the common electrode CE and is in contact with the liquid crystal layer LC.

The liquid crystal layer LC is arranged between the main surface 10B and the main surface 20A.

The transparent substrates 10 and 20 are, for example, insulating substrates such as glass substrates or plastic substrates. The insulating film 11 is formed of, for example, a transparent insulating material such as a silicon oxide, a silicon nitride, a silicon oxynitride or an acrylic resin. For example, the planarization film 11 includes an inorganic insulating film and an organic insulating film.

The pixel electrode PE is, for example, a transparent electrode formed of a transparent conductive material such as indium tin oxide (ITO) or indium zinc oxide (IZO). The metal film ML is formed of, for example, silver (Ag). The pixel electrode PE itself may be formed as a reflective electrode instead of providing the metal film ML on the pixel electrode PE. In this case, the pixel electrode PE is formed to have, for example, a three-layer stacked structure of indium zinc oxide (IZO), silver (Ag), and indium zinc oxide (IZO). The common electrode CE is, for example, a transparent electrode formed of a transparent conductive material such as indium tin oxide (ITO) or indium zinc oxide (IZO).

The alignment films AL1 and AL2 are horizontal alignment films having an alignment restriction force substantially parallel to the X-Y plane. The alignment restriction force can be imparted by a rubbing treatment or by an optical alignment treatment.

On the peripheral area SA side, the first substrate SUB1 comprises the transparent substrate 10, a wiring line group LG including wiring lines L, the planarization film 11, the Rx terminal portion RT, and the alignment film AL1, as shown in FIG. 7. Details of the already described constitution on the display area DA side will be omitted below.

The wiring line group LG including the wiring lines L is arranged on the main surface 10B side of the transparent substrate 10. The wiring lines L included in the wiring line group LG are covered with the planarization film 11. In FIG. 7, five wiring lines Ls including an Rx wiring line RL are illustrated as the wiring lines Ls included in the wiring line group LG, but the number of the wiring lines L included in the wiring line group LG is not limited thereto. The wiring lines L included in the wiring line group LG may further include the signal line S, a wiring line for applying power to the common electrode CE, and the like.

The Rx terminal portion RT is provided on the planarization film 11. The Rx terminal portion RT is provided at a position overlapped on the sealant 30 in planar view, and is connected to the Rx wiring line RL, which is one of the wiring lines included in the wiring line group LG, through a contact hole formed in the planarization film 11. The Rx terminal portion RT is electrically connected to the detection electrode Rx provided on the second substrate SUB2 side by the conductive pearls 31 contained in the sealant 30.

The alignment film AL1 covers the planarization film 11 and is in contact with the liquid crystal layer LC, in the area where the liquid crystal layer LC is arranged in the peripheral area SA.

On the peripheral area SA side, the second substrate SUB2 comprises the transparent substrate 20, the light-shielding film BM, the overcoat film OC, the detection electrode Rx, and the alignment film AL2, as shown in FIG. 7. Details of the already described constitution on the display area DA side will be omitted below.

The light-shielding film BM is arranged on the main surface 20A side of the transparent substrate 20. The light-shielding film BM is arranged over the substantially entire surface of the peripheral area SA. The overcoat film OC covers the light-shielding film BM together with the color filter CF on the display area DA side.

As shown in FIG. 7, the detection electrode Rx is arranged on the overcoat film OC. The detection electrode Rx is arranged on the same layer as the common electrode CE on the display area DA side, and is formed of, for example, the same transparent conductive material as the common electrode CE. The detection electrode Rx extends from the area where the sealant 30 is not arranged in the peripheral area SA (i.e., the area where the liquid crystal layer LC is arranged in the peripheral area SA) to the area where the sealant 30 is arranged, and is electrically connected to the Rx terminal portion RT and the Rx wiring RL arranged on the first substrate SUB1 side by the conductive pearls 31 contained in the sealant 30.

The alignment film AL2 covers the overcoat film OC and the detection electrode Rx and is in contact with the liquid crystal layer LC, in the area where the liquid crystal layer LC is arranged in the peripheral area SA.

The constitution in which the liquid crystal mode, which is classified into two modes according to the direction of application of the electric field to change the alignment of the liquid crystal molecules contained in the liquid crystal layer LC, is what is called a longitudinal electric field mode, is exemplified in FIG. 7, and this constitution is also applicable to the case where the liquid crystal mode is what is called a lateral electric field mode. The longitudinal electric field mode implies, for example, twisted nematic (TN) mode, vertical alignment (VA) mode, and the like. In addition, the above-described lateral electric field mode implies, for example, the In-Plane Switching (IPS) mode, the Fringe Field Switching (FFS) mode which is one of the IPS modes, and the like. When the lateral electric field mode is adopted, the common electrode CE provided in the display area DA is provided on the first substrate SUB1 side and faces the pixel electrode PE through a thin insulating layer. The detection electrode Rx is also provided on the first substrate SUB1 side, similarly to the common electrode CE. Even when the lateral electric field mode is adopted, the first lead wiring line CEL from the common electrode CE is drawn along the boundary part between the detection electrodes Rx, and an influence on each of the detection electrodes Rx caused by drawing the first lead wiring lines CEL can be equalized.

Figure 8:
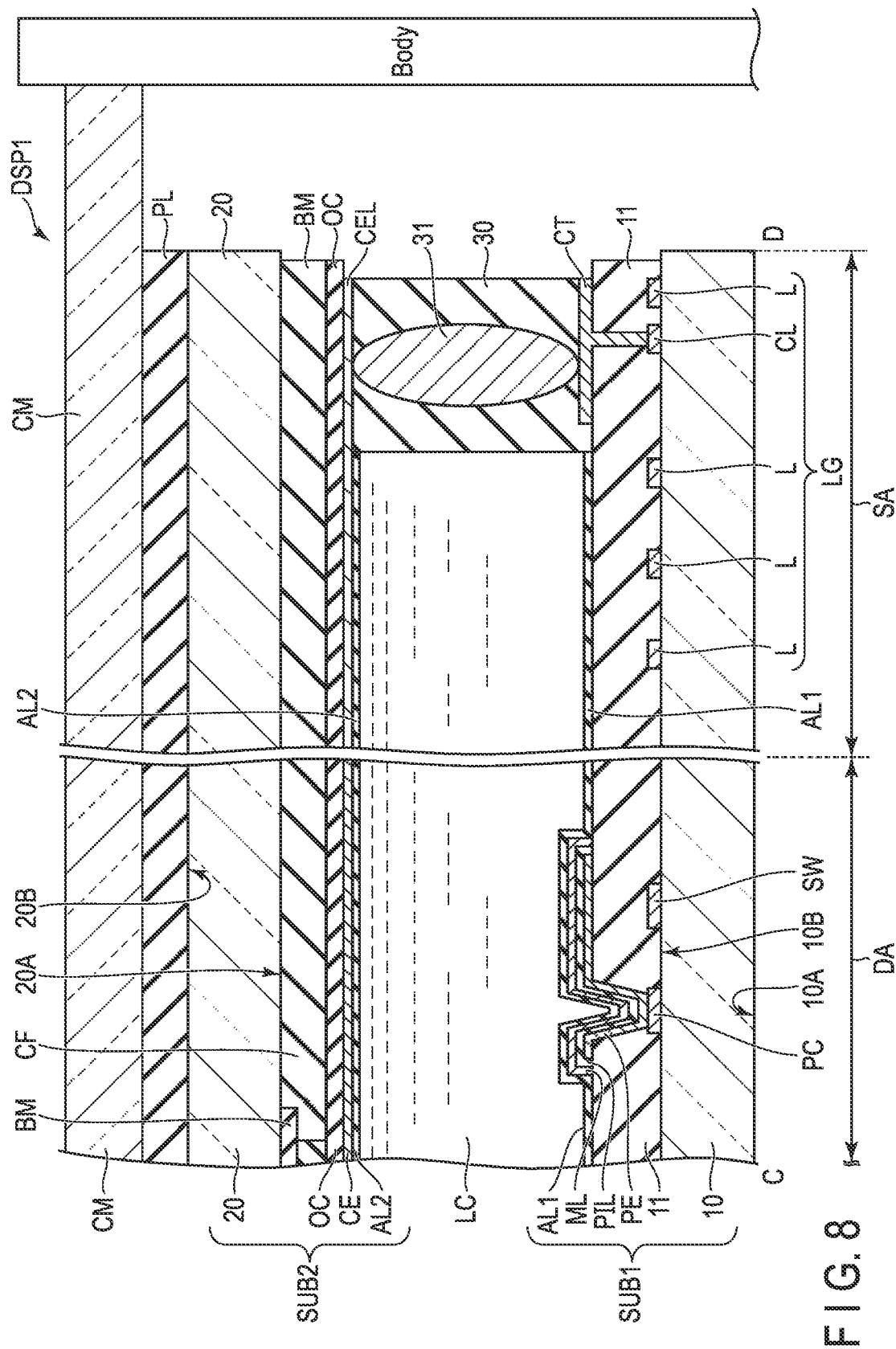
FIG. 8 is a cross-sectional view showing a cross section of the display device taken along line C-D of FIG. 12.

FIG. 8 is a cross-sectional view showing a cross section of the display device DSP1 taken along line C-D shown in FIG. 1. Since the configuration of the display area DA side is the same as that of the cross section illustrated in FIG. 7, detailed description thereof will be omitted here. The configuration different from that of the cross section illustrated in FIG. 7, of the configuration of the peripheral area SA side, will be mainly described below.

In the cross section illustrated in FIG. 8, the first substrate SUB1 comprises the transparent substrate 10, a wiring line group LG including wiring lines L, the planarization film 11, a common electrode terminal portion CT, and the alignment film AL1, as shown in FIG. 7.

The common electrode terminal portion CT is provided on the planarization film 11. The Rx terminal portion RT is provided at a position overlapped on the sealant 30 in planar view, and is connected to a common electrode wiring line CL, which is one of the lines included in the wiring line group LG, through a contact hole formed in the planarization film 11. The common electrode terminal portion CT is electrically connected to the first lead wiring line CEL (common electrode CE) provided on the second substrate SUB2 side by the conductive pearl 31 contained in the sealant 30.

In the cross section illustrated in FIG. 8, the second substrate SUB2 comprises the transparent substrate 20, the light-shielding film BM, the overcoat film OC, the first lead wiring line CEL, and the alignment film AL2.

The first lead wiring line CEL is provided on the overcoat film OC. The first lead wiring line CEL is a part of the common electrode CE and is formed integrally with the common electrode CE on the display area DA side. The first lead wiring line CEL extends from the area where the sealant 30 is not arranged in the peripheral area SA (i.e., the area where the liquid crystal layer LC is arranged in the peripheral area SA) to the area where the sealant 30 is arranged, and is electrically connected to the common electrode terminal portion CT and the common electrode wiring line CL arranged on the first substrate SUB1 side by the conductive pearls 31 contained in the sealant 30.

Advantages of the display device DSP1 according to the present embodiment will be described using a comparative example. The comparative example is intended to illustrate some of the advantages that the display device DSP1 according to the present embodiment can achieve, and does not exclude from the scope of the present invention advantages that are common to the comparative example and the present embodiment.

Figure 9:
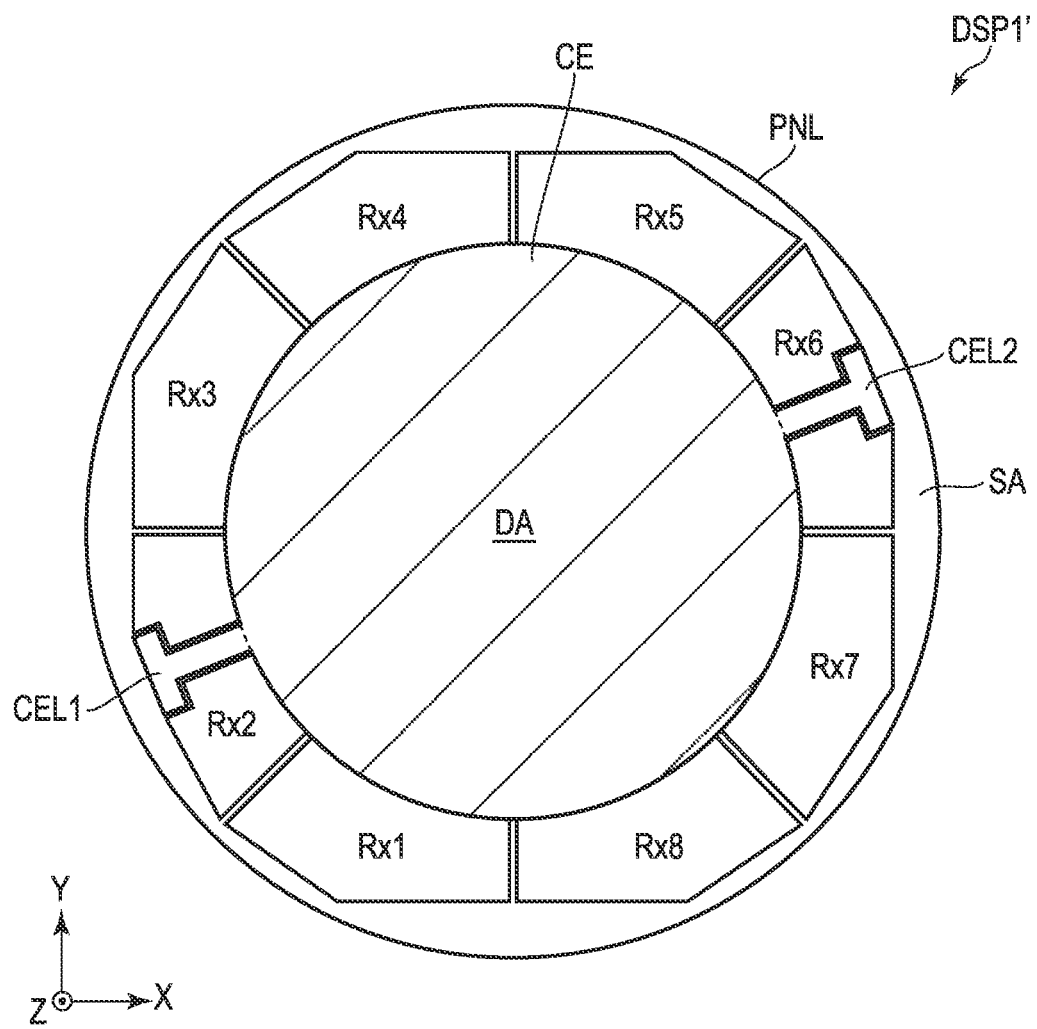
FIG. 9 is a plan view showing a configuration example of a display device according to a comparative example.

FIG. 9 is a plan view showing a configuration example of a display device DSP1' according to a comparative example. The display device DSP1' in the comparative example is different from the display device DSP1 of the present embodiment in that the common electrode CE includes two first lead wiring lines CEL1 and CEL2 and that these first lead wiring lines CEL1 and CEL2 are drawn so as to bisect the detection electrodes Rx2 and Rx6, respectively, as shown in FIG. 9. Each of the divided detection electrodes Rx2 is electrically connected via the Rx terminal portion RT arranged on the first substrate SUB1 side, and each of the divided detection electrodes Rx6 is electrically connected via the Rx terminal portion RT arranged on the first substrate SUB1 side.

In the display device DSP1' in the comparative example, since the detection electrode Rx1 is not adjacent to either the first lead wiring line CEL1 or CEL2, the fringe capacitances formed between the detection electrode Rx1 and the first lead wiring lines CEL are small. In other words, an influence caused by drawing the first lead wiring lines CEL to the peripheral area SA is small.

In addition, since the detection electrodes Rx3 to Rx5, Rx7, and Rx8 are similarly not adjacent to either the first lead wiring line CEL1 or CEL2, the fringe capacitances formed between each of the detection electrodes Rx and the first lead wiring lines CEL are small, and the influence caused by drawing the first lead wiring lines CEL to the peripheral area SA is small, although detailed description is omitted here.

In contrast, since the detection electrode Rx2 is adjacent to the first lead wiring line CEL1, the fringe capacitance formed between the detection electrode Rx2 and the first lead wiring line CEL1 is larger than that of the detection electrode Rx that is not adjacent to the first lead wiring line CEL1. Similarly, since the detection electrode Rx6 is adjacent to the first lead wiring line CEL2, the fringe capacitance formed between the detection electrode Rx6 and the first lead wiring line CEL2 is larger than that of the detection electrode Rx that is not adjacent to the first lead wiring line CEL2. In other words, the influence on the first lead wiring line CEL caused by drawing the first lead wiring line CEL to the peripheral area SA is larger than the influence on the detection electrode Rx which is not adjacent to the first lead wiring line CEL.

Figure 10:
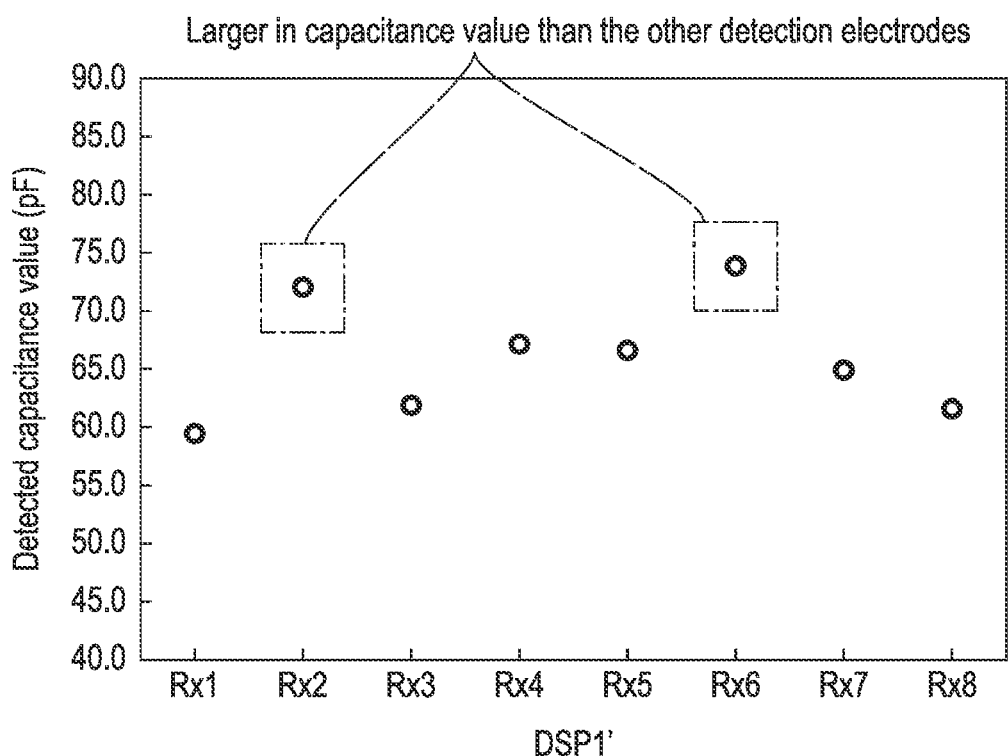
FIG. 10 is a graph showing capacitance of each detection electrode in the display device according to the comparative example.

For this reason, as shown in FIG. 10, the capacitances of the detection electrodes Rx2 and Rx6, which are greatly influenced by drawing the first lead wiring lines CEL to the peripheral area SA, tend to be larger than those of the detection electrodes Rx1, Rx3 to Rx5, Rx7, and Rx8, which are less influenced. If a difference (variation) in the capacitances of the detection electrodes Rx1 to Rx8 is made, a problem arises that the adjustment process performed by an analog front end circuit (AFE circuit) for touch detection becomes more complicated.

In contrast, in the display device DSP1 according to the present embodiment, since the first lead wiring lines CEL is drawn from the common electrode CE such that the influence on each of the detection electrodes Rx1 to Rx8 caused by drawing the first lead wiring lines CEL to the peripheral area SA is equalized, the capacitance of each of the detection electrodes Rx1 to Rx8 can be substantially equalized and the complication of the adjustment process performed by the above-mentioned AFE circuit can be suppressed.

Figure 11:
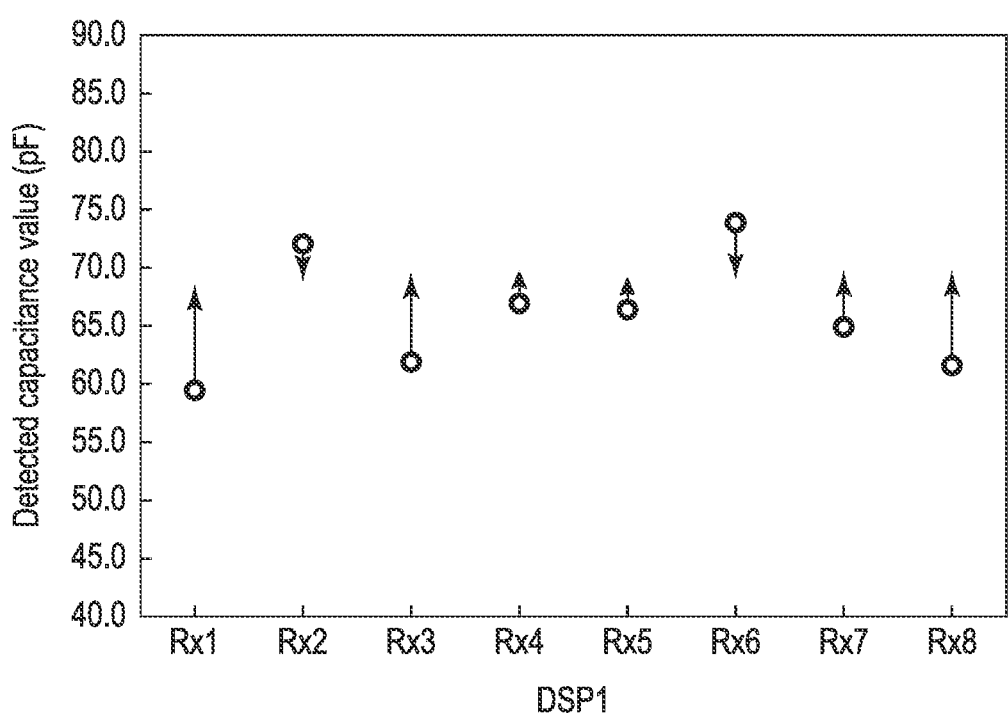
FIG. 11 is a graph illustrating advantages of the display device according to the embodiment.

For example, in the drawing method shown in FIG. 1, the capacitances of the detection electrodes Rx2 and Rx6 decrease as compared with those in the comparative example, and the capacitances of the detection electrodes Rx1, Rx3 to Rx5, Rx7, and Rx8 increase as compared with those in the comparative example, as shown in FIG. 11, such that the capacitances of the detection electrodes Rx1 to Rx8 are more equalized than those in the comparative example.

Figure 12:
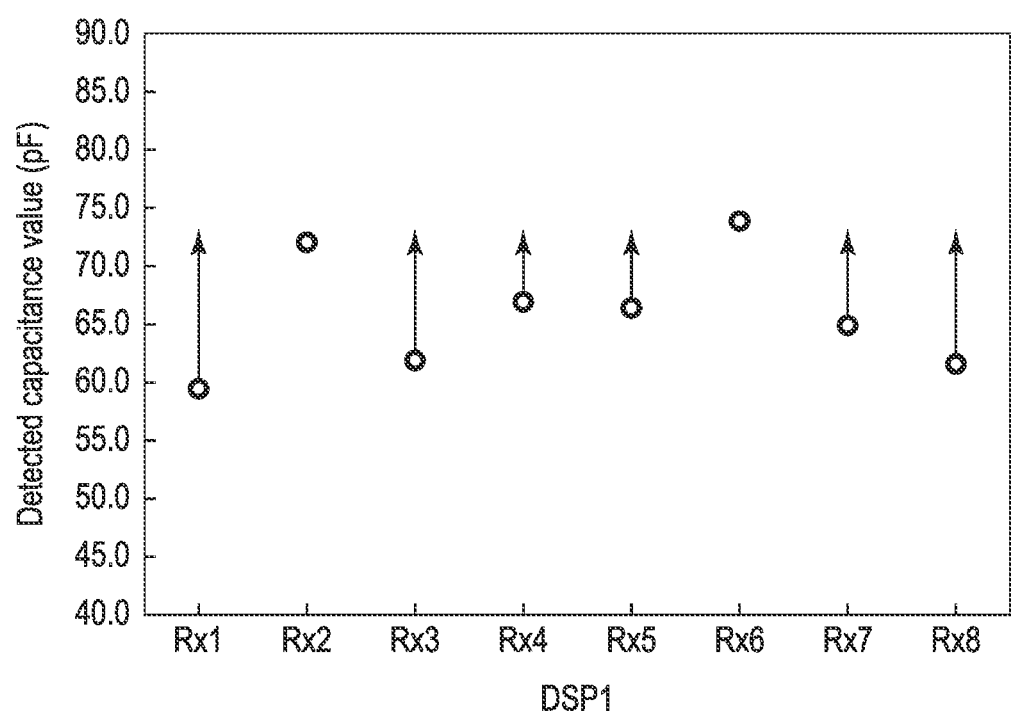
FIG. 12 is another graph illustrating advantages of the display device according to the embodiment.

In addition, in the drawing method shown in FIG. 2 and FIG. 3, the capacitances of the detection electrodes Rx1, Rx3 to Rx5, Rx7, and Rx8 increase as compared with those in the comparative example and become substantially equal to the capacitances of the detection electrodes Rx2 and Rx6 in the comparative example, as shown in FIG. 12, such that the capacitances of the detection electrodes Rx1 to Rx8 are substantially equalized.

According to the configuration of the first embodiment described above, the influence on each of the detection electrodes Rx1 to Rx8 caused by drawing the first lead wiring lines CEL from the common electrode CE to the peripheral area SA can be equalized, and the complication of the adjustment process performed by the above-mentioned AFE circuit can be suppressed.

Second Embodiment

Figure 13:
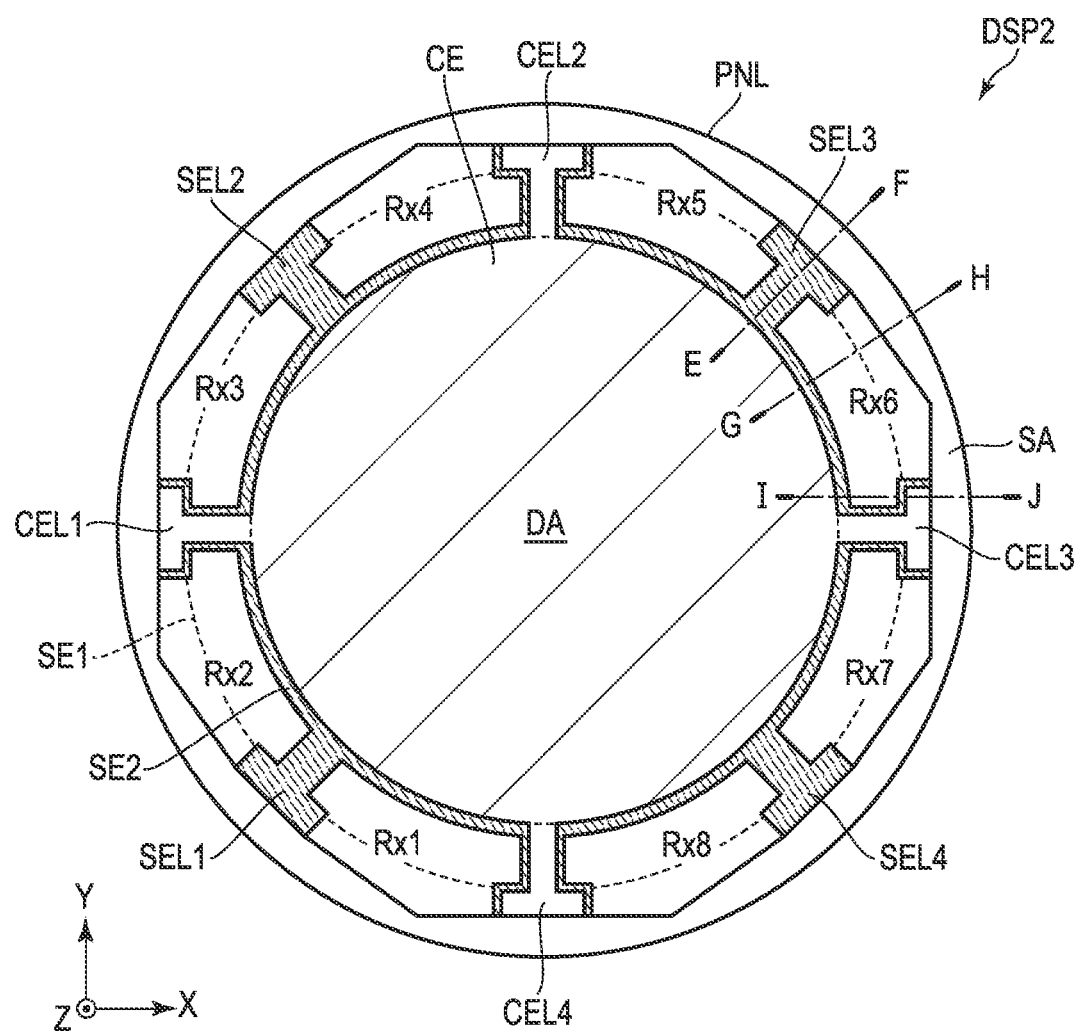
FIG. 13 is a plan view showing a configuration example of a display device according to a second embodiment.

Next, a second embodiment will be described. FIG. 13 is a plan view showing a configuration example of a display device DSP2 according to a first embodiment.

The display device DSP2 according to the second embodiment is different from the configuration of the first embodiment described above in that the first shield electrode SE1 and the second shield electrode SE2 are further provided to surround the display area DA as shown in FIG. 13. Specific constituent elements of the display device DSP2 according to the second embodiment will be mainly described and description of the same configuration as that of the first embodiment will be omitted below.

As shown in FIG. 13, the first shield electrode SE1 and the second shield electrode SE2 are arranged to surround the display area DA in planar view. More specifically, the first shield electrode SE1 of an annular shape (donut shape) is arranged so as to surround the display area DA, in planar view, in the display device DSP2. In addition, the second shield electrode SE2 is arranged so as to surround the common electrode CE in planar view, in the display device DSP2. In FIG. 13, the second shield electrode SE2 is hatched with shaded lines having a narrow pitch, for convenience of description. The first shield electrode SE1 and the second shield electrode SE2 are at least partially overlapped on each other in planar view, and the first shield electrode SE1 is arranged under the second shield electrode SE2.

As shown in FIG. 13, the second shield electrode SE2 includes second lead wiring lines SEL1 to SEL4 extending along a boundary part where the first lead wiring lines CEL1 to CEL4, which are part of the common electrode CE, are not drawn, of the boundary parts between a predetermined detection electrode Rx and a detection electrode Rx adjacent to the predetermined detection electrode Rx.

More specifically, as shown in FIG. 13, the second lead wiring line SEL1 extends along a boundary part between the detection electrode Rx1 and the detection electrode Rx2 adjacent to the detection electrode Rx1. The second lead wiring line SEL2 extends along a boundary part between the detection electrode Rx3 and the detection electrode Rx4 adjacent to the detection electrode Rx3. The second lead wiring line SEL3 extends along a boundary part between the detection electrode Rx5 and the detection electrode Rx6 adjacent to the detection electrode Rx5. The second lead wiring line SEL4 extends along a boundary part between the detection electrode Rx7 and the detection electrode Rx8 adjacent to the detection electrode Rx7.

The second lead wiring lines SEL1 to SEL4, like the first lead wiring lines CEL1 to CEL4, extend to the outer periphery of the detection electrodes Rx1 to Rx8 and are electrically connected to a wiring line (not shown) for applying power to the second shield electrode SE2 via the conductive pearls 31 contained in the sealant 30.

A GND voltage (with a same potential as the detection electrode Rx) or a predetermined DC voltage (fixed voltage) is applied to the first shield electrode SE1 and the second shield electrode SE2.

According to the method of drawing the first lead wiring line CEL and the second lead wiring line SEL shown in FIG. 13, for example, the detection electrode Rx1 forms a fringe capacitance between the detection electrode Rx1 and the first lead wiring line CEL4 by electric charge that leaks out and is not fully shielded in the second shield electrode SE2 surrounding the first lead wiring line CEL4, and a fringe capacitance between the detection electrode Rx1 and the second lead wiring line SEL1.

In addition, the detection electrode Rx2 forms a fringe capacitance between the detection electrode Rx2 and the first lead wiring line CEL1 by electric charge that leaks out and is not fully shielded in the second shield electrode SE2 surrounding the first lead wiring line CEL1, and a fringe capacitance between the detection electrode Rx2 and the second lead wiring line SEL1.

Furthermore, the detection electrode Rx3 forms a fringe capacitance between the detection electrode Rx3 and the first lead wiring line CEL1 by electric charge that leaks out and is not fully shielded in the second shield electrode SE2 surrounding the first lead wiring line CEL1, and a fringe capacitance between the detection electrode Rx3 and the second lead wiring line SEL2.

Descriptions of formation of a fringe capacitance between each of the detection electrodes Rx1 to Rx8 and the first lead wiring line CEL and the second lead wiring line SEL will be omitted below, but the detection electrodes Rx4 to Rx8 also form a fringe capacitance between itself and the first lead wiring line CEL that is provided at the boundary part between the adjacent detection electrodes Rx, and a fringe capacitance between itself and the second lead wiring line SEL that is provided at the boundary part between the adjacent detection electrodes Rx, similarly to the above-described detection electrodes Rx1 to Rx3.

In other words, according to the drawing method shown in FIG. 13, since each of the detection electrodes Rx1 to Rx8 forms a fringe capacitance between itself and any one of the first lead wiring lines CEL1 to CEL4, and a fringe capacitance between itself and any one of the second lead wiring lines SEL1 to SEL4, the influence on each of the detection electrodes Rx1 to Rx8 caused by drawing the first lead wiring lines CEL and the second lead wiring lines SEL to the peripheral area SA can be substantially equalized.

As shown in FIG. 14, even when the shape of the detection electrodes Rx1 to Rx8 is a shape in which two arcs are combined in a circumferential direction such that they are displaced from each other on the inside and the outside, the first lead wiring lines CEL and the second lead wiring lines SEL are drawn alternately along each of the boundary parts of the detection electrode Rx1 to Rx8, and the influence on each of the detection electrodes Rx1 to Rx8 caused by drawing the first lead wiring lines CEL and the second lead wiring lines SEL to the peripheral area SA can be thereby substantially equalized.

Figure 15:
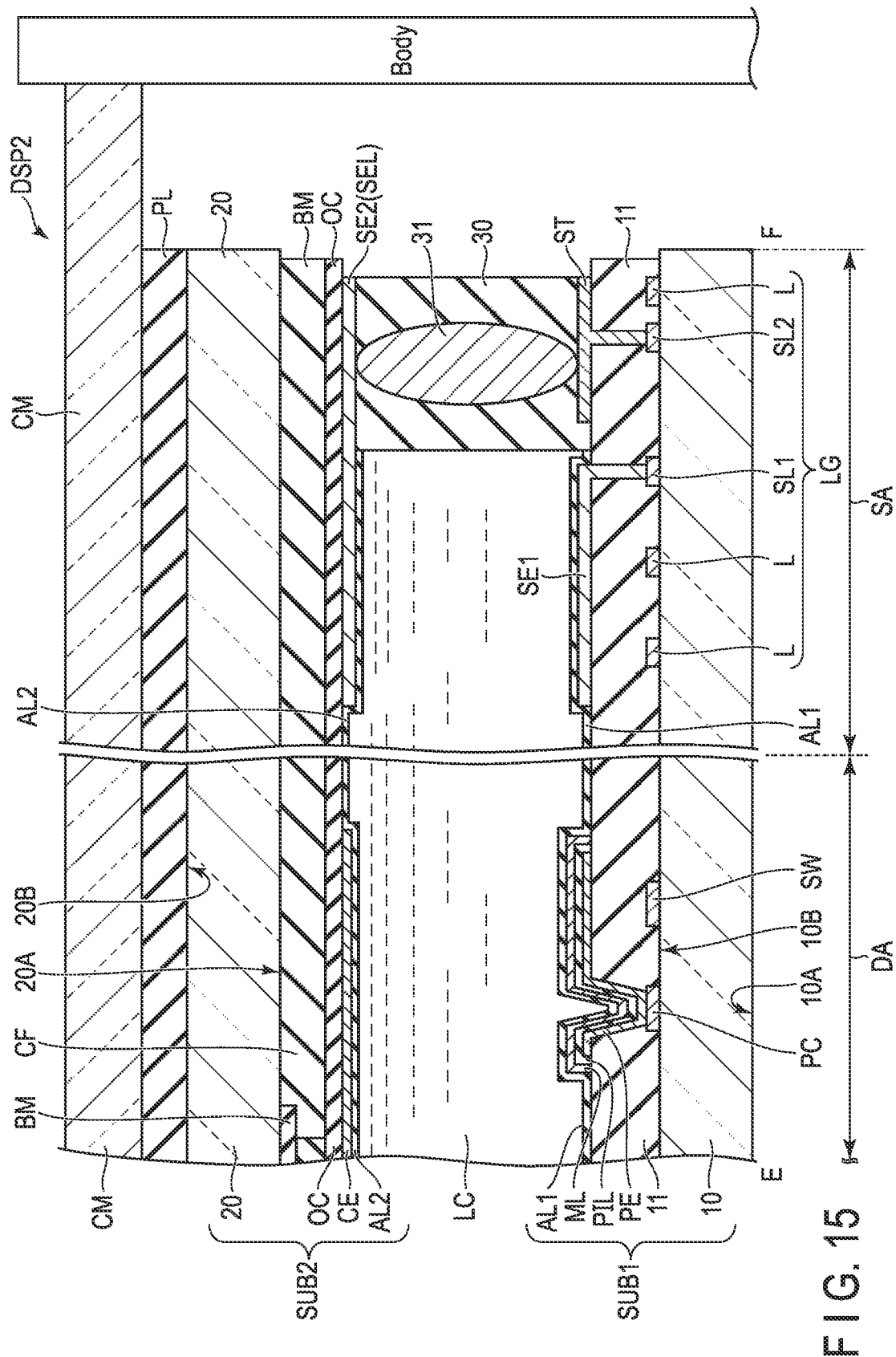
FIG. 15 is a cross-sectional view showing a cross section of the display device taken along line E-F of FIG. 13.

FIG. 15 is a cross-sectional view showing a cross section of the display device DSP2 taken along line E-F shown in FIG. 13. Since the configuration of the display area DA side is the same as that of the above-described first embodiment, detailed description thereof will be omitted here. The detection electrode Rx, the first shield electrode SE1, the second shield electrode SE2, and the like, of the configuration of the peripheral area SA side, will be mainly described below.

The first shield electrode SE1 is provided on the planarization film 11 of the first substrate SUB1 and is connected to a first shield wiring line SL1, which is one of the wiring lines included in the wiring line group LG, through a contact hole formed in the planarization film 11. The first shield electrode SE1 is arranged to be opposed to at least parts of the wiring lines L included in the wiring line group LG and to be positioned between the wiring line group LG and the detection electrode Rx in the third direction Z. The first shield electrode SE1 is arranged on the same layer as the pixel electrode PE on the display area DA side, and is formed of, for example, the same transparent conductive material as the pixel electrode PE.

As described above, a GND voltage (with a same potential as the detection electrode Rx) or a predetermined DC voltage (fixed voltage) is applied to the first shield electrode SE1 via the first shield wiring line SL1. According to this, the first shield electrode SE1 can suppress the detection electrode Rx from capacitively coupling with other constituent elements (for example, the wiring lines L included in the wiring line group LG).

The second shield electrode SE2 (second lead wiring line SEL) is provided on the overcoat film OC of the second substrate SUB2. In the cross section illustrated in FIG. 15, the second lead wiring line SEL which is a part of the second shield electrode SE2 extends from the area where the sealant 30 is not arranged in the peripheral area SA (i.e., the area where the liquid crystal layer LC is arranged in the peripheral area SA) to the area where the sealant 30 is arranged, and is electrically connected to a shield terminal portion ST and a second shield wiring line SL2 arranged on the first substrate SUB1 side by the conductive pearls 31 contained in the sealant 30. The second shield electrode SE2 (second lead wiring line SEL) is arranged on the same layer as the common electrode CE on the display area DA side, and is formed of, for example, the same transparent conductive material as the common electrode CE.

As described above, a GND voltage (with a same potential as the detection electrode Rx) or a predetermined DC voltage (fixed voltage) is applied to the second shield electrode SE2 via the second shield wiring line SL2, the shield terminal portion ST, and the conductive pearls 31 and the second lead wiring line SEL. According to this, the second shield electrode SE2 can suppress the detection electrode Rx from being capacitively coupled with other constituent elements (for example, the pixel electrode PE and the common electrode CE on the display area DA side).

Figure 16:
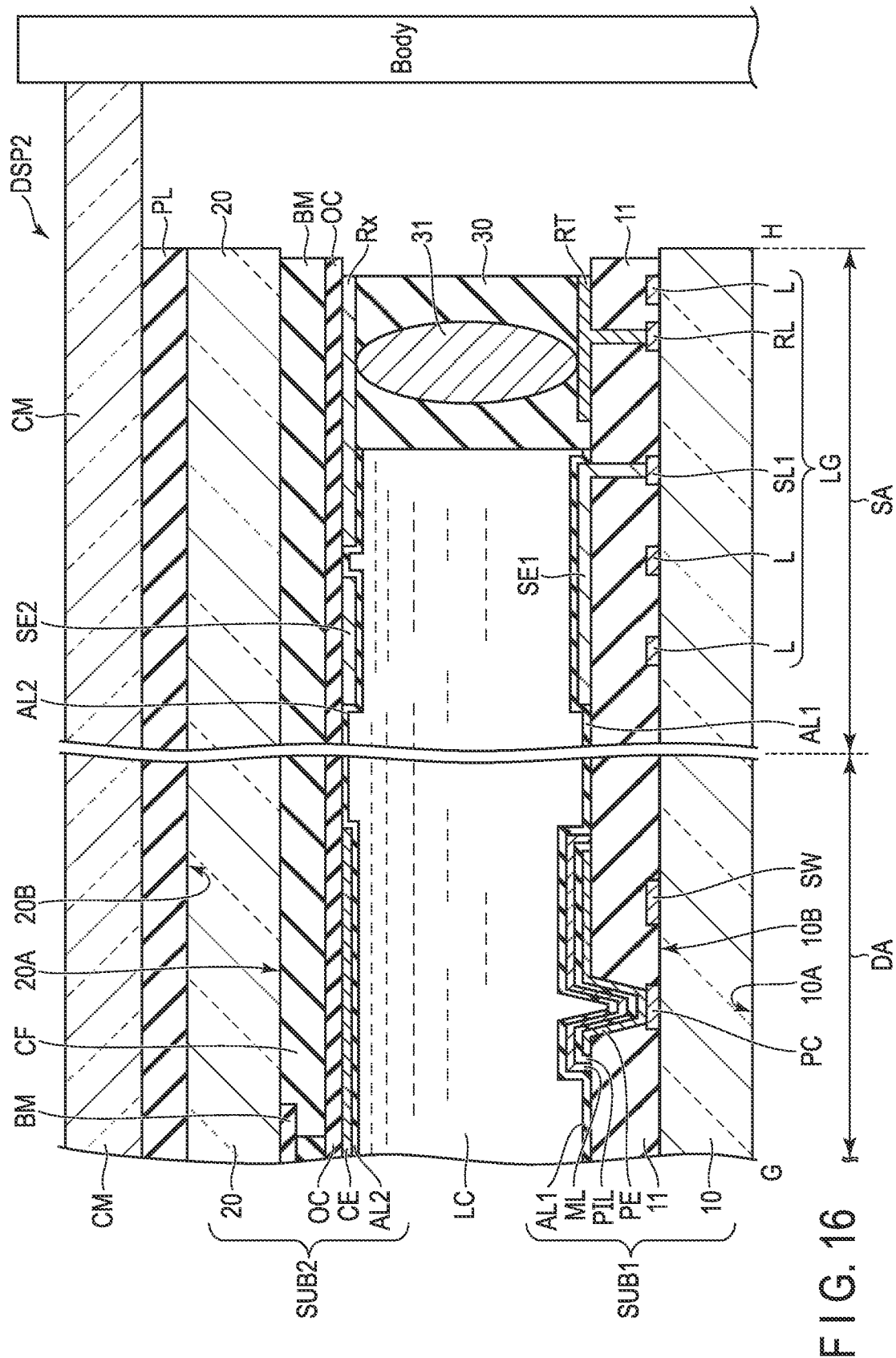
FIG. 16 is a cross-sectional view showing a cross section of the display device taken along line G-H of FIG. 13.

FIG. 16 is a cross-sectional view showing a cross section of the display device DSP2 taken along line G-H shown in FIG. 13. Since the configuration of the display area DA side is the same as that of the above-described first embodiment, detailed description thereof will be omitted here. The detection electrode Rx, the first shield electrode SE1, the second shield electrode SE2, and the like, of the configuration of the peripheral area SA side, will be mainly described below.

As shown in FIG. 16, the second shield electrode SE2 and the detection electrode Rx are arranged in the same layer, and the second shield electrode SE2 is arranged closer to the display area DA than to the detection electrode Rx. In the cross section illustrated in FIG. 16, the detection electrode Rx extends from the area where the sealant 30 is not arranged in the peripheral area SA (i.e., the area where the liquid crystal layer LC is arranged in the peripheral area SA) to the area where the sealant 30 is arranged, and is electrically connected to the Rx terminal portion RT and the Rx wiring line RL arranged on the first substrate SUB1 side by the conductive pearls 31 contained in the sealant 30.

FIG. 17 is a cross-sectional view showing a cross section of the display device DSP2 taken along line I-J shown in FIG. 13. Since the configuration of the display area DA side is the same as that of the above-described first embodiment, detailed description thereof will be omitted here. The detection electrode Rx, the first shield electrode SE1, the second shield electrode SE2, and the like, of the configuration of the peripheral area SA side, will be mainly described below.

In the cross section illustrated in FIG. 17, the second shield electrode SE2 (second lead wiring line SEL), the detection electrode Rx, the second lead wiring line SEL (second shield electrode SE2), and the first lead wiring line CEL are arranged in order in the direction of separating from the display area DA (from the inside to the outside), in the peripheral area SA on the second substrate SUB2 side. As already explained, since the second shield electrode SE2 is provided to surround the common electrode CE, the second shield electrode SE2 is arranged between the common electrode CE and the detection electrode Rx, and the second lead wiring line SEL which is a part of the shield electrode SE2 is arranged between the first lead wiring line CEL which is a part of the common electrode CE and the detection electrode Rx, as shown in FIG. 17.

In the configuration according to the second embodiment described above, the influence on each of the detection electrodes Rx1 to Rx8 caused by drawing the first lead wiring lines CEL and the second lead wiring lines SEL to the peripheral area SA can be made substantially uniform. For this reason, the same advantages as those of the first embodiment can also be obtained in the configuration example of the second embodiment.

In addition, in the configuration of the second embodiment, unlike the above-described first embodiment, since the first shield electrode SE1 and the second shield electrode SE2 are provided, the capacitive coupling of the detection electrode Rx with other constituent elements can be suppressed as described above and, according to this, improvement of the display quality in displaying an image on the display area DA, improvement of the accuracy in touch detection performed by the detection electrode Rx, and the like can be expected.

Figure 18:
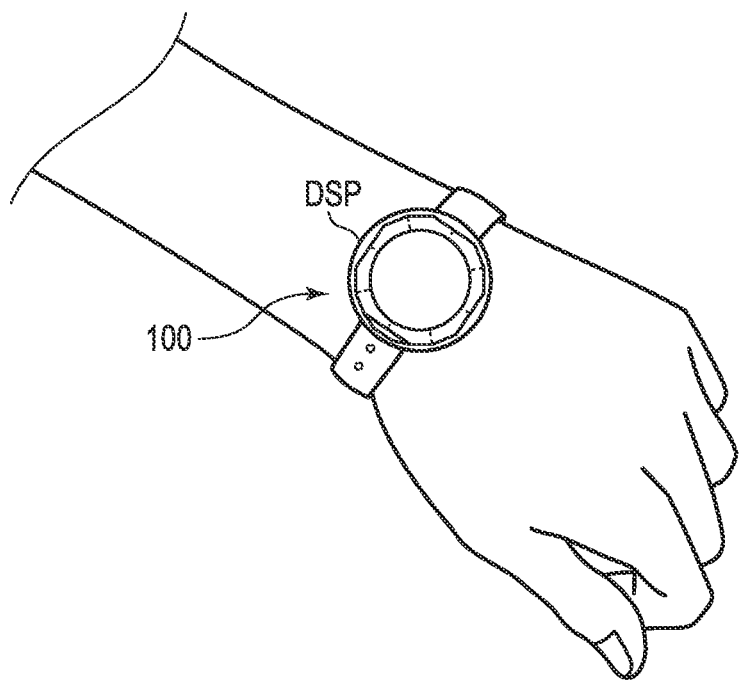
FIG. 18 is a view showing an application example of the display device according to each of the embodiments.

FIG. 18 shows an application example of the display device DSP according to each embodiment. As shown in FIG. 18, the display device DSP is applied to, for example, a wristwatch 100. In this case, the time and the like are displayed in the display area DA of the display device DSP, and the display device DSP can detect a predetermined gesture by touching a detection electrode arranged in the peripheral area SA (for example, a gesture to touch an outer peripheral part of a clock so as to rotate clockwise by one rotation, a gesture to touch an outer peripheral part of a clock so as to rotate counterclockwise by one rotation, a gesture to tap or the like) and can realize an operation according to the detected predetermined gesture.

Figure 19:
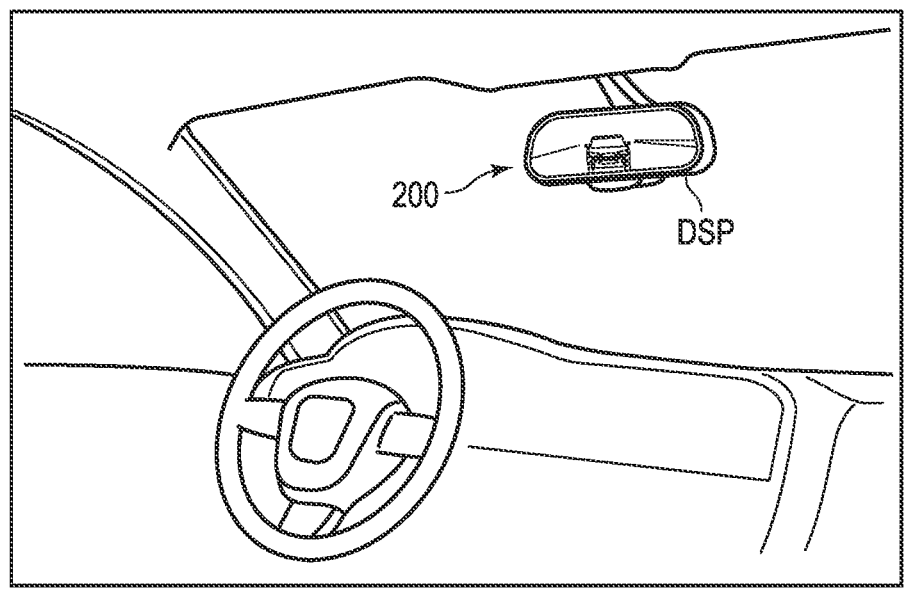
FIG. 19 is a view showing another application example of the display device according to each of the embodiments.

FIG. 19 shows another application example of the display device DSP according to each embodiment. As shown in FIG. 19, the display device DSP is applied to, for example, an in-vehicle rear-view mirror 200. In this case, an image and the like of a rear side of a vehicle captured by a camera installed in the vehicle is displayed in the display area DA of the display device DSP, and the display device DSP can detect a predetermined gesture by touching a detection electrode arranged in the peripheral area SA, and can realize an operation according to the detected predetermined gesture.

Figure 20:
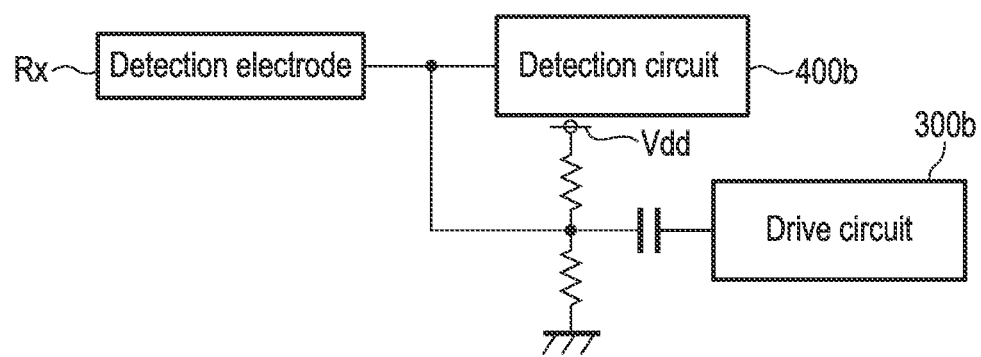
FIG. 20 is a diagram illustrating an example of a principle of self-capacitive touch detection.

FIG. 20 is a diagram illustrating an example of a principle of self-capacitive touch detection. A voltage obtained by dividing the voltage of a power supply Vdd by a resistor division is supplied to the detection electrode Rx as a bias voltage. A drive signal of a predetermined waveform is supplied from a drive circuit 300$b$ to the detection electrode Rx by capacitive coupling or the like, and a detection signal of a predetermined waveform is read from the detection electrode Rx. At this time, if a capacitance caused by a finger or the like is loaded on the detection electrode Rx, the amplitude of the detection electrode is varied. In FIG. 20, the amplitude of the detection electrode Rx is lowered. Therefore, in an equivalent circuit illustrated in FIG. 20, the presence or absence of contact or approach of an external proximate object such as a finger is detected by detecting the amplitude of the detection electrode Rx in the detection circuit 400*b*. The self-detection circuit is not limited to the circuit illustrated in FIG. 20, and any circuit system may be adopted as long as the presence or absence of an external proximate object such as a finger can be detected only by the detection electrode.

According to the at least one embodiment described above, the display device capable of equalizing the variation in the influence that various wiring lines (first lead wiring line CEL and second lead wiring line SEL) may give to touch sensors (detection electrodes Rx) arranged in the peripheral area SA, and of improving the operability by the touch sensors, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate;
   a second substrate opposed to the first substrate;
   detection electrodes provided to surround a display area where an image is displayed; and
   a common electrode provided over an entire surface of the display area,
   the common electrode including a first lead wiring extending to a peripheral area around the display area, along a boundary part between a first detection electrode, which is one of the detection electrodes, and a second detection electrode adjacent to the first detection electrode,
   a capacitance formed between the first lead wiring and the first detection electrode being substantially equal to a capacitance formed between the first lead wiring and the second detection electrode.

2. The display device of claim 1, wherein
   the first lead wiring is not provided at a boundary part between the first detection electrode and a third detection electrode which is adjacent to the first detection electrode on a side opposite to the second detection electrode.

3. The display device of claim 2, further comprising:
   a shield electrode provided in the peripheral area to surround the common electrode, wherein
   the shield electrode includes a second lead wiring extending to the peripheral area along a boundary part between the first detection electrode and the third detection electrode.

4. The display device of claim 3, wherein
   the shield electrode is provided on the second substrate side.

5. The display device of claim 1, wherein
   the first lead wiring is also provided at a boundary part between the first detection electrode and a third detection electrode which is adjacent to the first detection electrode on a side opposite to the second detection electrode.

6. The display device of claim 1, wherein
   the common electrode is provided on the second substrate side.

7. The display device of claim 1, wherein
   the detection electrodes are provided on the second substrate side.

* * * * *